US012075954B2

(12) United States Patent
Schultz et al.

(10) Patent No.: US 12,075,954 B2
(45) Date of Patent: *Sep. 3, 2024

(54) FLEXIBLE MOUNTING SYSTEM FOR HAND HYGIENE DISPENSERS

(71) Applicant: Ecolab USA Inc., St. Paul, MN (US)

(72) Inventors: Andrew M. Schultz, Minneapolis, MN (US); Sarah E. Gilbertson, Saint Paul, MN (US); Daniel D. Anderson, Eagan, MN (US); Cheryl A. Littau, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,635

(22) Filed: Jan. 21, 2022

(65) Prior Publication Data

US 2022/0142414 A1 May 12, 2022

Related U.S. Application Data

(63) Continuation of application No. 16/883,169, filed on May 26, 2020, now Pat. No. 11,253,109, which is a (Continued)

(51) Int. Cl.
*A47K 5/12* (2006.01)
*A47L 13/512* (2006.01)
(Continued)

(52) U.S. Cl.
CPC .............. *A47K 5/1211* (2013.01); *A47K 5/12* (2013.01); *A47K 5/1204* (2013.01);
(Continued)

(58) Field of Classification Search
CPC ...... A47K 5/1211; A47K 5/12; A47K 5/1204; A47K 5/1205; A47K 5/1207;
(Continued)

(56) References Cited

U.S. PATENT DOCUMENTS 2,883,139 A 4/1959 Dobkin
3,032,081 A 5/1962 La Cotta
(Continued)

FOREIGN PATENT DOCUMENTS

CA 839355 A 11/1903
CN 1242815 A 1/2000
(Continued)

OTHER PUBLICATIONS

Communication Pursuant to Rules 161(1) and 162 EPC dated Nov. 28, 2017 from counterpart European Application No. 16774333.5, 2 pp.
(Continued)

*Primary Examiner* — Vishal Pancholi
*Assistant Examiner* — Robert K Nichols, II
(74) *Attorney, Agent, or Firm* — Fredrikson & Byron, P.A.

(57) ABSTRACT

A product dispenser mounting system includes a dispenser holder body configured to support a product dispenser; and a mounting apparatus configured to fixedly mount on a support object and to removably connect to the dispenser holder body in one or more orientations such that dispenser holder body is maintained in a selected one of the one or more orientations when the dispenser holder body is connected to the mounting apparatus. The system may also include at least one actuation sensor configured to detect actuation of the product dispenser.

19 Claims, 27 Drawing Sheets

Related U.S. Application Data continuation of application No. 16/023,974, filed on Jun. 29, 2018, now Pat. No. 10,667,654, which is a continuation of application No. 15/088,751, filed on Apr. 1, 2016, now Pat. No. 10,039,423.

(60) Provisional application No. 62/141,629, filed on Apr. 1, 2015.

(51) Int. Cl.

| | | |
|---|---|---|
| *B05B 15/62* | (2018.01) | |
| *F16B 2/10* | (2006.01) | |
| *F16B 5/06* | (2006.01) | |
| *F16B 21/09* | (2006.01) | |
| *F16M 11/10* | (2006.01) | |
| *F16M 13/02* | (2006.01) | |
| *A47K 10/32* | (2006.01) | |
| *F16M 11/04* | (2006.01) | |

(52) U.S. Cl.
CPC .......... *A47K 5/1205* (2013.01); *A47K 5/1207* (2013.01); *A47K 5/1215* (2013.01); *A47L 13/512* (2013.01); *B05B 15/62* (2018.02); *F16B 2/10* (2013.01); *F16B 5/0657* (2013.01); *F16B 21/09* (2013.01); *F16M 11/105* (2013.01); *F16M 13/02* (2013.01); *F16M 13/022* (2013.01); *A47K 5/1217* (2013.01); *A47K 2010/3226* (2013.01); *A47K 2010/3233* (2013.01); *A47K 2010/3266* (2013.01); *A47K 2201/025* (2013.01); *F16M 11/041* (2013.01); *F16M 2200/024* (2013.01)

(58) Field of Classification Search
CPC ..... A47K 5/1215; B05B 15/62; B05B 11/308; A47L 13/512; F16B 2/10; F16B 5/0657; F16B 21/09; F16M 11/105; F16M 13/02; G01F 11/267; A61M 15/0073; A61M 15/0075; A61M 15/0076; A61M 15/0068; A61M 15/007; A61M 15/0071; A61M 15/008

See application file for complete search history.

(56) References Cited

U.S. PATENT DOCUMENTS

| | | | |
|---|---|---|---|
| 3,033,404 | A | 5/1962 | Adell |
| 3,198,437 | A | 8/1965 | Faglie |
| 4,164,306 | A | 8/1979 | Perrin |
| 4,166,553 | A | 9/1979 | Fraterrigo |
| 4,185,759 | A | 1/1980 | Zissimopoulos |
| 4,240,129 | A | 12/1980 | Kawazoe |
| 4,461,445 | A | 7/1984 | Williamson et al. |
| 4,504,168 | A | 3/1985 | Miller |
| 4,561,571 | A | 12/1985 | Chen |
| 4,997,157 | A | 3/1991 | Sweeny |
| 5,350,087 | A | 9/1994 | Frazier et al. |
| 5,435,511 | A | 7/1995 | Hsu |
| 5,449,137 | A | 9/1995 | Bell et al. |
| 5,638,989 | A | 6/1997 | Ophardt et al. |
| 5,992,698 | A | 11/1999 | Copeland et al. |
| 6,131,773 | A | 10/2000 | Wade et al. |
| 6,209,184 | B1 | 4/2001 | Copeland et al. |
| 6,540,119 | B1 | 4/2003 | Bensussan et al. |
| 6,575,335 | B2 | 6/2003 | Lewis et al. |
| 6,609,679 | B1 | 8/2003 | Seidel |
| 6,637,707 | B1 | 10/2003 | Gates et al. |
| 6,820,770 | B2 | 11/2004 | Makino et al. |
| 7,090,085 | B1 | 8/2006 | Vicendese et al. |
| 7,104,467 | B2 | 9/2006 | Crossdale et al. |
| D533,742 | S | 12/2006 | Matthews et al. |
| 7,254,895 | B1 | 8/2007 | O'Donnell |
| 7,275,729 | B2 | 10/2007 | Sherman et al. |
| 7,290,683 | B2 | 11/2007 | Gerenraich |
| 7,315,245 | B2 | 1/2008 | Lynn et al. |
| 7,375,640 | B1 | 5/2008 | Plost |
| 7,404,534 | B1 | 7/2008 | Hajianpour |
| 7,423,533 | B1 | 9/2008 | Leblond et al. |
| 7,654,321 | B2 | 2/2010 | Zazovsky et al. |
| 7,793,902 | B2 | 9/2010 | Buchanan et al. |
| 7,857,170 | B2 | 12/2010 | Ophardt |
| 8,030,940 | B2 | 10/2011 | Nishimoto |
| 8,096,445 | B2 | 1/2012 | Yang et al. |
| 8,100,299 | B2 | 1/2012 | Phelps et al. |
| 8,169,327 | B2 | 5/2012 | Lynn |
| 8,230,888 | B2 | 7/2012 | Crossdale et al. |
| 8,240,517 | B1 | 8/2012 | Stob et al. |
| 8,286,835 | B2 | 10/2012 | Morey et al. |
| 8,350,706 | B2 | 1/2013 | Wegelin et al. |
| 8,395,515 | B2 | 3/2013 | Tokhtuev et al. |
| 8,407,018 | B2 | 3/2013 | White et al. |
| 8,489,348 | B2 | 7/2013 | Shirriff et al. |
| 8,502,680 | B2 | 8/2013 | Tokhtuev et al. |
| 8,558,701 | B2 | 10/2013 | Wegelin et al. |
| 8,598,848 | B2 | 12/2013 | Zheng et al. |
| 8,603,014 | B2 | 12/2013 | Alleman et al. |
| 8,616,511 | B2 | 12/2013 | James |
| 8,631,843 | B2 | 1/2014 | O'brien |
| 8,668,178 | B2 | 3/2014 | Ziaylek et al. |
| 8,731,622 | B2 | 5/2014 | Kanade et al. |
| 8,751,845 | B2 | 6/2014 | Assad et al. |
| 8,757,573 | B1 | 6/2014 | Barnes, Jr. |
| 8,766,643 | B2 | 7/2014 | Thoren et al. |
| 8,783,511 | B2 | 7/2014 | Snodgrass |
| 8,816,860 | B2 | 8/2014 | Ophardt et al. |
| 8,844,769 | B2 | 9/2014 | Rosenkranz et al. |
| 8,965,595 | B2 | 2/2015 | Wegelin |
| 9,078,936 | B1 | 7/2015 | Denby, Jr. |
| 9,117,361 | B1 | 8/2015 | Hennigan et al. |
| 9,123,233 | B2 | 9/2015 | Hermann |
| 9,131,811 | B2 | 9/2015 | Wegelin et al. |
| 9,144,160 | B2 | 9/2015 | Chuang |
| D777,020 | S | 1/2017 | Zlatic et al. |
| 9,770,141 | B2 | 9/2017 | Wegelin et al. |
| 10,039,423 | B2 | 8/2018 | Schultz et al. |
| 10,667,654 | B2 | 6/2020 | Schultz et al. |
| 2001/0054626 | A1 | 12/2001 | Bethune et al. |
| 2002/0100676 | A1 | 8/2002 | Janniere |
| 2004/0150527 | A1 | 8/2004 | Harper et al. |
| 2005/0282142 | A1 | 12/2005 | Lynn et al. |
| 2006/0043051 | A1 | 3/2006 | Bissett |
| 2006/0067545 | A1 | 3/2006 | Lewis et al. |
| 2006/0067546 | A1 | 3/2006 | Lewis et al. |
| 2006/0071799 | A1 | 4/2006 | Verdiramo |
| 2006/0081749 | A1 | 4/2006 | Sherman et al. |
| 2006/0175341 | A1 | 8/2006 | Rodrian |
| 2006/0186140 | A1 | 8/2006 | Kanfer et al. |
| 2006/0273915 | A1 | 12/2006 | Snodgrass |
| 2007/0229288 | A1 | 10/2007 | Ogrin et al. |
| 2008/0019490 | A1 | 1/2008 | Lynn |
| 2008/0087719 | A1 | 4/2008 | Sahud |
| 2008/0131332 | A1 | 6/2008 | Nguyen et al. |
| 2008/0290112 | A1 | 11/2008 | Lynn |
| 2008/0302440 | A1 | 12/2008 | Crossdale et al. |
| 2009/0051545 | A1 | 2/2009 | Koblasz |
| 2009/0068116 | A1 | 3/2009 | Arndt |
| 2009/0166378 | A1 | 7/2009 | Stilley |
| 2009/0166381 | A1 | 7/2009 | Phelps et al. |
| 2009/0195385 | A1 | 8/2009 | Huang et al. |
| 2009/0289163 | A1 | 11/2009 | Morey et al. |
| 2009/0299787 | A1 | 12/2009 | Barnhill |
| 2010/0094581 | A1 | 4/2010 | Cagle |
| 2010/0153374 | A1 | 6/2010 | Leblond et al. |
| 2010/0164728 | A1 | 7/2010 | Plost |
| 2010/0207767 | A1 | 8/2010 | Verdiramo |
| 2010/0212778 | A1 | 8/2010 | O'Brien |
| 2010/0315243 | A1 | 12/2010 | Tokhtuev et al. |
| 2010/0328076 | A1 | 12/2010 | Kyle et al. |
| 2010/0332022 | A1 | 12/2010 | Wegelin et al. |
| 2011/0024585 | A1 | 2/2011 | Brinkdopke et al. |
| 2011/0030730 | A1 | 2/2011 | Lynn |

(56) References Cited

U.S. PATENT DOCUMENTS

| | | |
|---|---|---|
| 2011/0046921 A1 | 2/2011 | Sahud |
| 2011/0088809 A1 | 4/2011 | Lin |
| 2011/0093313 A1 | 4/2011 | Leblond et al. |
| 2011/0163870 A1 | 7/2011 | Snodgrass |
| 2011/0180564 A1 | 7/2011 | Jones et al. |
| 2011/0234407 A1 | 9/2011 | Harris et al. |
| 2011/0259920 A1 | 10/2011 | Rennie et al. |
| 2011/0273298 A1 | 11/2011 | Snodgrass et al. |
| 2011/0316701 A1 | 12/2011 | Alper et al. |
| 2011/0320134 A1 | 12/2011 | Butler et al. |
| 2012/0055986 A1 | 3/2012 | Sahud |
| 2012/0112914 A1 | 5/2012 | Wegelin et al. |
| 2012/0181405 A1 | 7/2012 | Zlatic et al. |
| 2012/0187146 A1 | 7/2012 | Chopra |
| 2012/0218106 A1 | 8/2012 | Zaima et al. |
| 2012/0245729 A1 | 9/2012 | Wegelin et al. |
| 2012/0256742 A1 | 10/2012 | Snodgrass et al. |
| 2012/0274468 A1 | 11/2012 | Wegelin et al. |
| 2012/0317432 A1 | 12/2012 | Assad et al. |
| 2012/0329438 A1 | 12/2012 | Snodgrass |
| 2013/0009027 A1 | 1/2013 | Morey et al. |
| 2013/0025714 A1 | 1/2013 | Hermann |
| 2013/0027199 A1 | 1/2013 | Bonner |
| 2013/0043284 A1 | 2/2013 | Wegelin et al. |
| 2013/0048142 A1 | 2/2013 | Crossdale et al. |
| 2013/0075346 A1 | 3/2013 | Rumberger et al. |
| 2013/0076514 A1 | 3/2013 | Wegelin et al. |
| 2013/0087579 A1 | 4/2013 | Knighton |
| 2013/0098941 A1 | 4/2013 | Wegelin |
| 2013/0099900 A1 | 4/2013 | Pulvermacher |
| 2013/0113931 A1 | 5/2013 | Alper |
| 2013/0120120 A1 | 5/2013 | Long et al. |
| 2013/0229276 A1 | 9/2013 | Hunter |
| 2013/0261795 A1 | 10/2013 | Long et al. |
| 2013/0264355 A1 | 10/2013 | Jodoin |
| 2013/0264925 A1 | 10/2013 | Kling |
| 2013/0292411 A1 | 11/2013 | Bem |
| 2013/0306105 A1 | 11/2013 | Battah |
| 2013/0323003 A1 | 12/2013 | Carson |
| 2014/0015670 A1 | 1/2014 | Wegelin et al. |
| 2014/0076938 A1 | 3/2014 | Bonner et al. |
| 2014/0081653 A1 | 3/2014 | Davis et al. |
| 2014/0091926 A1 | 4/2014 | Gips et al. |
| 2014/0158714 A1 | 6/2014 | Snodgrass et al. |
| 2014/0197194 A1 | 7/2014 | Wegelin et al. |
| 2014/0311239 A1 | 10/2014 | Marjanovic et al. |
| 2015/0022361 A1 | 1/2015 | Gaisser et al. |
| 2015/0061867 A1 | 3/2015 | Engelhard et al. |
| 2015/0083754 A1* | 3/2015 | Proper ............ B67D 3/0029 222/180 |
| 2015/0134357 A1 | 5/2015 | Davis et al. |
| 2015/0199883 A1 | 7/2015 | Hartley et al. |
| 2015/0313422 A1 | 11/2015 | Ophardt et al. |
| 2016/0374519 A1 | 12/2016 | Murphy |
| 2018/0255918 A1 | 9/2018 | Walker |
| 2018/0255981 A1 | 9/2018 | Rospierski et al. |
| 2018/0317717 A1 | 11/2018 | Schultz et al. |
| 2020/0205055 A1 | 6/2020 | Snodgrass |
| 2020/0281416 A1 | 9/2020 | Schultz et al. |
| 2021/0012640 A1 | 1/2021 | Tokhtuev et al. |

FOREIGN PATENT DOCUMENTS

| | | |
|---|---|---|
| CN | 101955023 A | 1/2011 |
| CN | 102083351 A | 6/2011 |
| CN | 103403434 A | 11/2013 |
| CN | 103784070 A | 5/2014 |
| DE | 202006013711 U1 | 9/2007 |
| DE | 202012104121 U1 | 11/2012 |
| EP | 963728 A1 | 12/1999 |
| EP | 1031309 A1 | 8/2000 |
| EP | 1235506 A1 | 9/2002 |
| EP | 1311454 A1 | 5/2003 |
| EP | 1872802 A2 | 1/2008 |
| EP | 2111780 A1 | 10/2009 |
| EP | 2509017 A2 | 10/2012 |
| EP | 2511889 A2 | 10/2012 |
| EP | 2663800 A1 | 11/2013 |
| EP | 3581897 B1 | 9/2020 |
| WO | 2001041612 A1 | 6/2001 |
| WO | 0214208 A1 | 2/2002 |
| WO | 2002094073 A1 | 11/2002 |
| WO | 2004101122 A2 | 11/2004 |
| WO | 2005055793 A3 | 6/2005 |
| WO | 2008006209 A2 | 1/2008 |
| WO | 2008006209 A3 | 1/2008 |
| WO | 2008118143 A2 | 10/2008 |
| WO | 2010093349 A1 | 8/2010 |
| WO | 2010104564 A2 | 9/2010 |
| WO | 2010109175 A1 | 9/2010 |
| WO | 2010143091 A2 | 12/2010 |
| WO | 2010143092 A2 | 12/2010 |
| WO | 2011058293 A1 | 5/2011 |
| WO | 2011069624 A1 | 6/2011 |
| WO | 2011085292 A2 | 7/2011 |
| WO | 2011119695 A2 | 9/2011 |
| WO | 2011131800 A1 | 10/2011 |
| WO | 2012064515 A2 | 5/2012 |
| WO | 2012097246 A1 | 7/2012 |
| WO | 2012146300 A1 | 11/2012 |
| WO | 2012148771 A2 | 11/2012 |
| WO | 2012150563 A1 | 11/2012 |
| WO | 2012178045 A2 | 12/2012 |
| WO | 2013003661 A1 | 1/2013 |
| WO | 2013025956 A1 | 2/2013 |
| WO | 2013033243 A2 | 3/2013 |
| WO | 2013049357 A2 | 4/2013 |
| WO | 2013049462 A1 | 4/2013 |
| WO | 2013058821 A1 | 4/2013 |
| WO | 2013063690 A1 | 5/2013 |
| WO | 2013070888 A1 | 5/2013 |
| WO | 2013074660 A1 | 5/2013 |
| WO | 2013140253 A1 | 9/2013 |
| WO | 2013165585 A1 | 11/2013 |
| WO | 2013188814 A1 | 12/2013 |
| WO | 2014027030 A2 | 2/2014 |
| WO | 2014209636 A1 | 12/2014 |
| WO | 2015/017702 A2 | 2/2015 |
| WO | 2017200965 A1 | 11/2017 |
| WO | 2018165107 A1 | 9/2018 |

OTHER PUBLICATIONS

Examination Report from counterpart Australian Application No. 2016243942, dated Sep. 5, 2019, 4 pp.

Extended Search Report from counterpart European Application No. 16774333.5, dated Oct. 16, 2018, 8 pp.

First Office Action and Search Report, and translation thereof, from counterpart Chinese Application No. 201680017912.7, dated Oct. 29, 2019, 21 pp.

International Preliminary Report on Patentability from International Application No. PCT/US2016/025617, mailed Oct. 12, 2017, 6 pp.

International Search Report and Written Opinion from corresponding International Application No. PCT/US2016/025617, mailed Jul. 14, 2016, 12 pp.

Notice of Acceptance for Patent Application from counterpart Australian Application No. 2016243942, dated Jan. 8, 2020, 8 pp.

Notice of Grant, and translation thereof, from counterpart Chinese Application No. 201680017912.7, mailed Jul. 6, 2020, 6 pp.

Notice of Intent to Grant and Text Intended to Grant from counterpart European Application No. 16774333.5, dated Apr. 24, 2020, 127 pp.

Notification of Entry into Substantive Examination Procedure, and translation thereof, from counterpart Chinese Application No. 201680017912.7, Mailed Mar. 9, 2018, 2 pp.

Prosecution History from U.S. Appl. No. 15/088,751, dated Jun. 28, 2017 through Jul. 10, 2018, 44 pp.

Prosecution History from U.S. Appl. No. 16/023,974, dated Apr. 12, 2019 through Jan. 28, 2020, 47 pp.

(56) References Cited

OTHER PUBLICATIONS

Prosecution History from U.S. Appl. No. 16/883,169, dated Jun. 25, 2021 through Oct. 29, 2021, 30 pp.
Purell Versahold Point of Care Bracket, Installation Instructions, 2011 (Applicant points out, in accordance with MPEP 609.04(a), that the year of publication, 2011, is sufficiently earlier than the effective U.S. filing date, 2015, so that the particular month of publication is not in issue.).
Response to Examination Report dated Sep. 5, 2019, from counterpart Australian Application No. 2016243942, filed Dec. 10, 2019, 22 pp.
Response to Extended Search Report dated Oct. 16, 2018, from counterpart European Application No. 16774333.5, filed Apr. 30, 2019, 33 pp.
U.S. Appl. No. 14/819,349, filed Aug. 5, 2015, by Tokhtuev et al.
U.S. Appl. No. 17/383,689, filed Jul. 23, 2021, by Tokhtuev et al.
U.S. Appl. No. 17/648,248, filed Jan. 18, 2022, naming inventors Steinmetz et al.
Response to Office Action dated May 12, 2022, from counterpart Canadian Application No. 2,981,181 filed Aug. 26, 2022, 56 pp.
Ex Parte Quayle Action from U.S. Appl. No. 17/648,248 dated Aug. 5, 2022, 8 pp.
Response to Ex Parte Quayle Action dated Aug. 5, 2022 from U.S. Appl. No. 17/648,248, filed Oct. 4, 2022, 8 pp.
Office Action from counterpart Canada Application No. 2,981,181 dated May 12, 2022, 6 pp.
Response to Office Action dated Nov. 24, 2022, from counterpart Canadian Application No. 2,981,181 filed Mar. 17, 2023, 110 pp.
Notice of Allowance from U.S. Appl. No. 17/648,248 dated Nov. 9, 2022, 10 pp.
Office Action from counterpart Canadian Application No. 2,981,181 dated Nov. 24, 2022, 4 pp.
Notice of Intent to Grant from counterpart Canadian Application No. 2,981,181 dated Apr. 20, 2023, 1 pp.

* cited by examiner

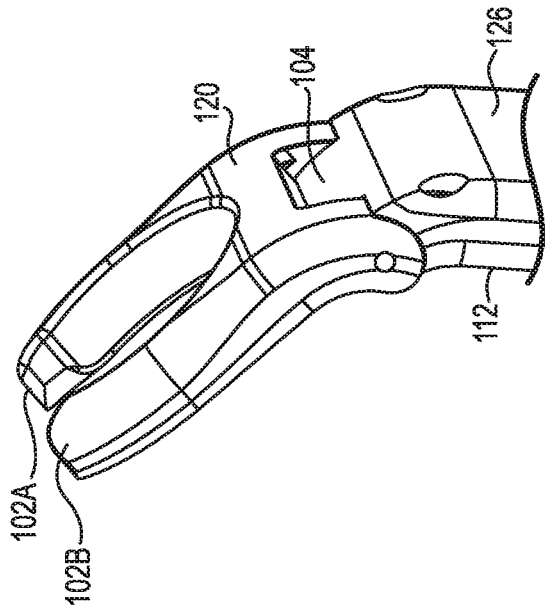
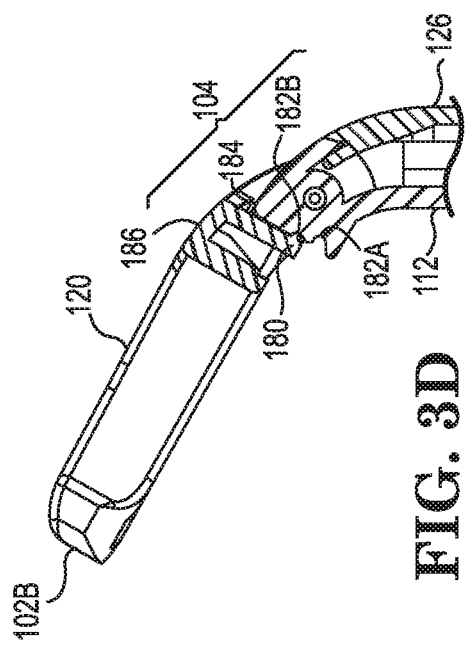
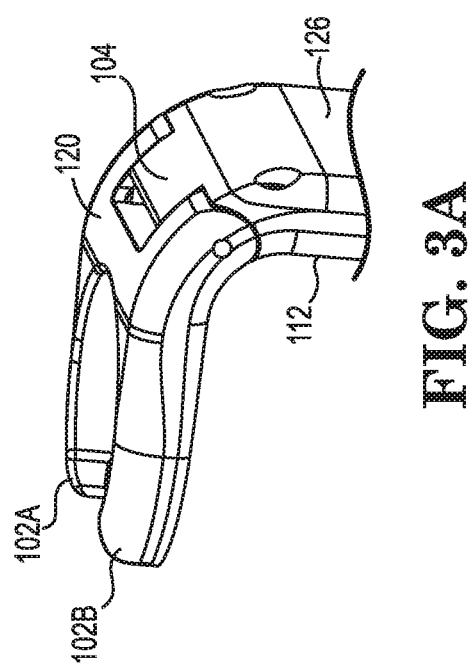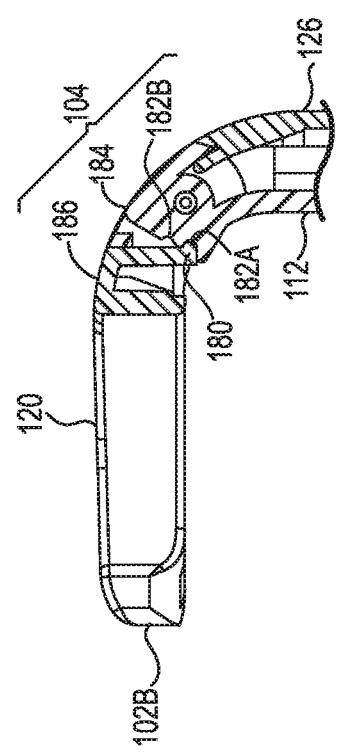
FIG. 3A
FIG. 3B
FIG. 3C
FIG. 3D

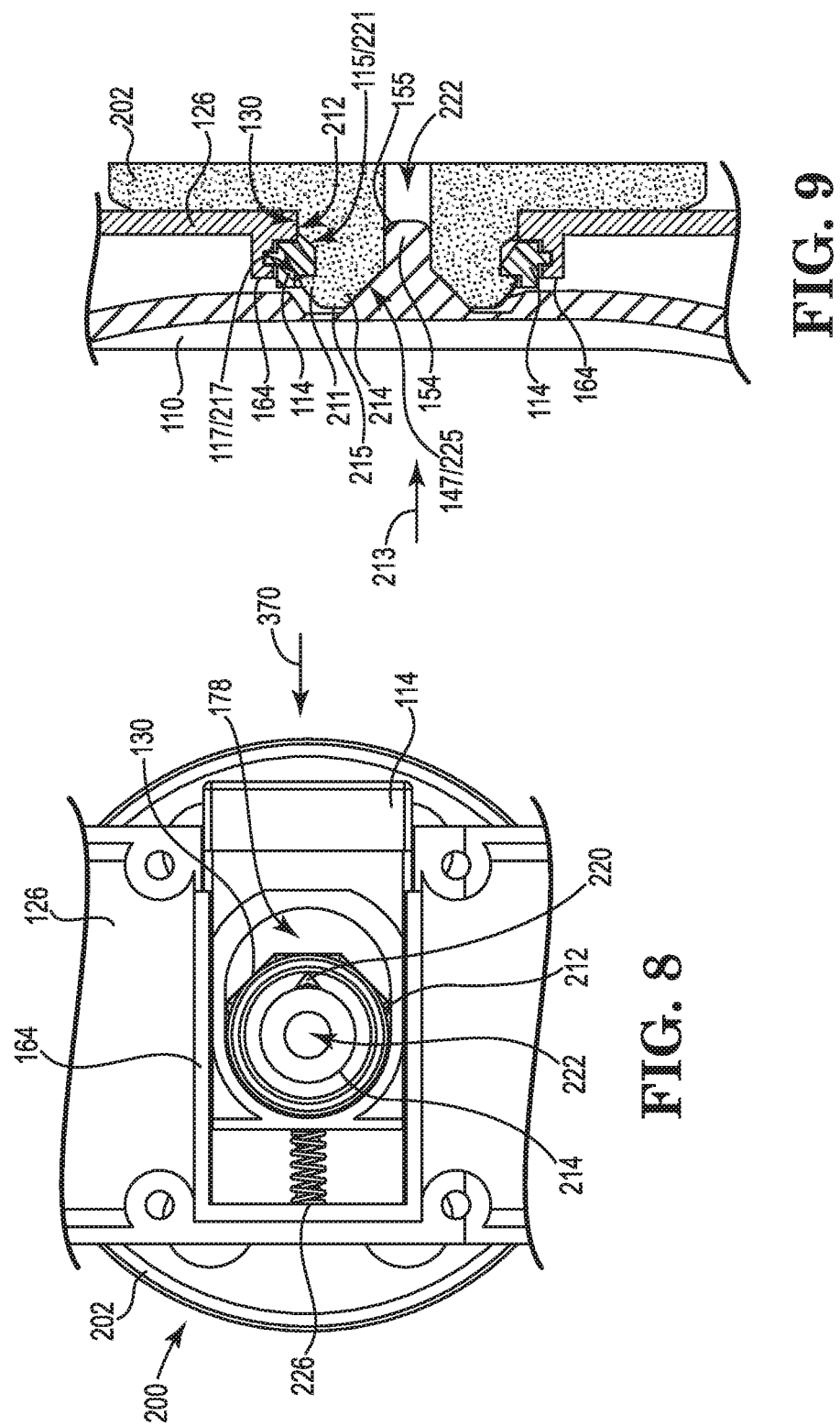

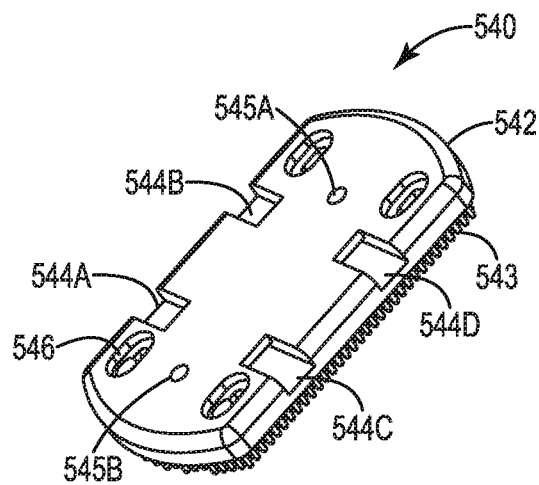
FIG. 15A
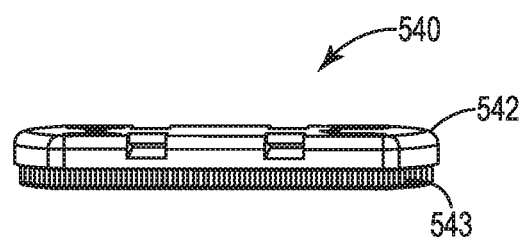
FIG. 15B
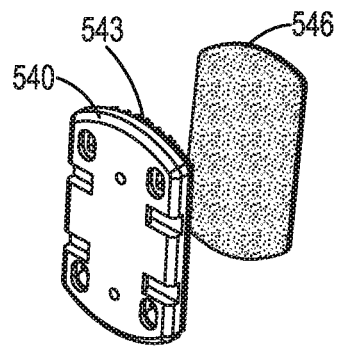 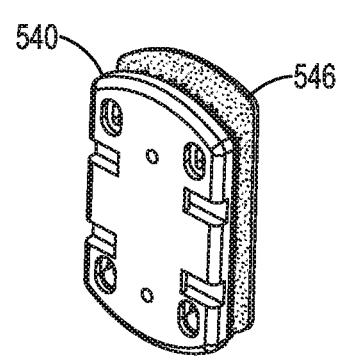 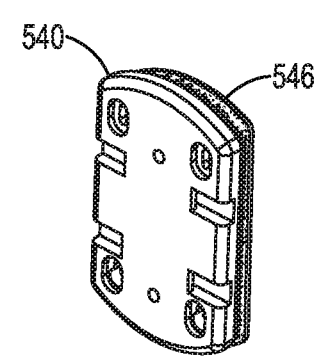
FIG. 15C  FIG. 15D  FIG. 15E

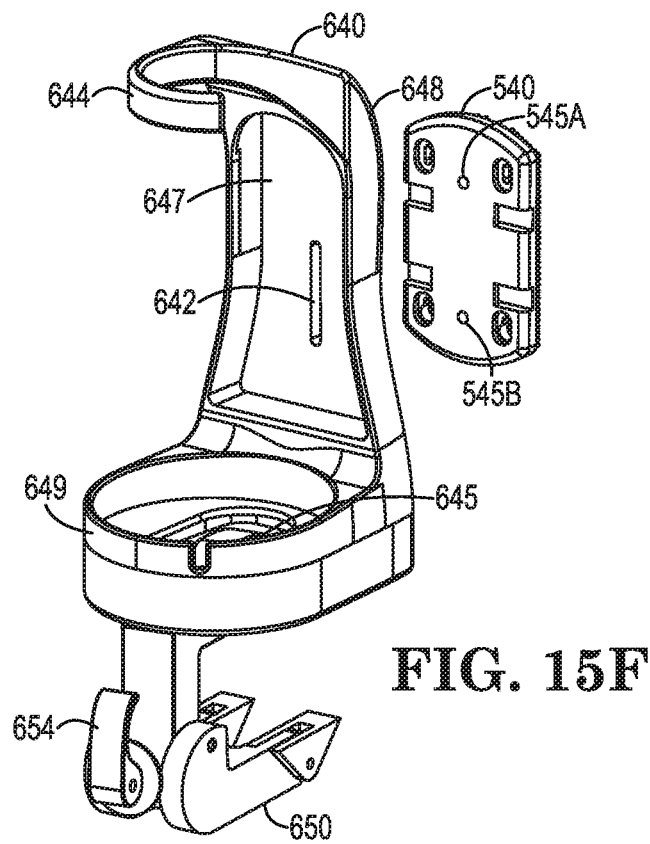
FIG. 15F
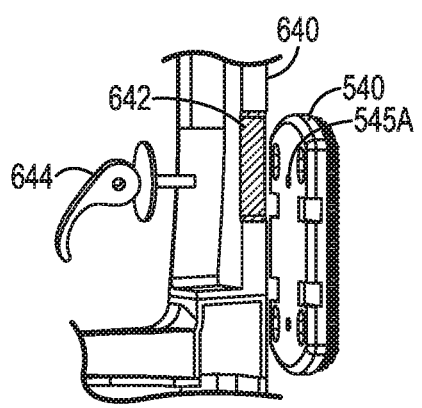
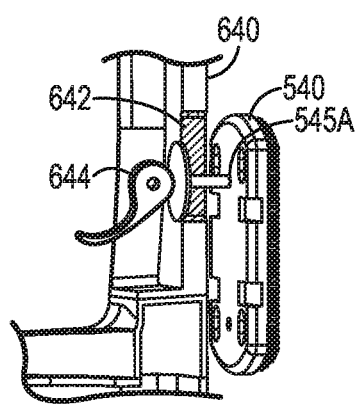
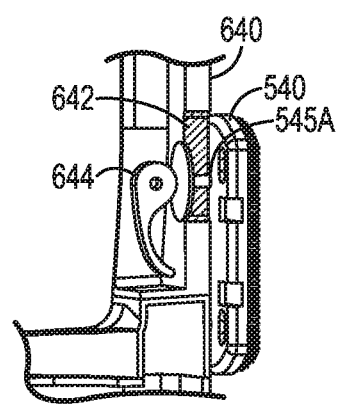
FIG. 15G     FIG. 15H     FIG. 15I

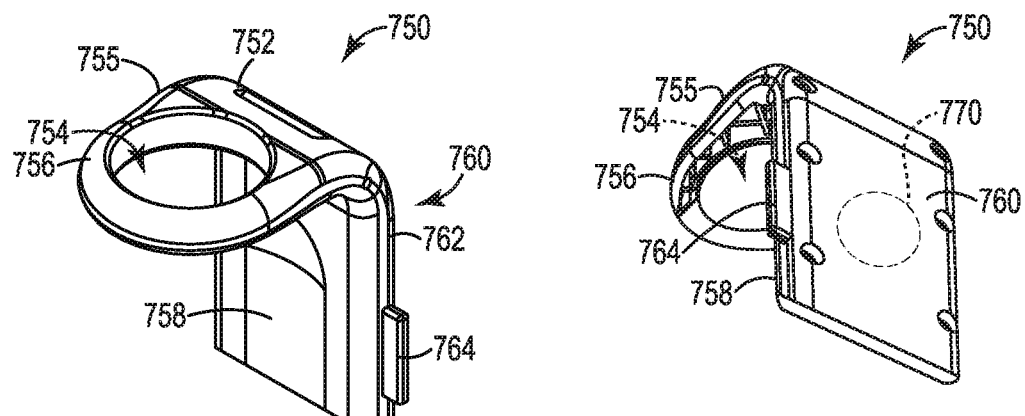
FIG. 20A
FIG. 20B
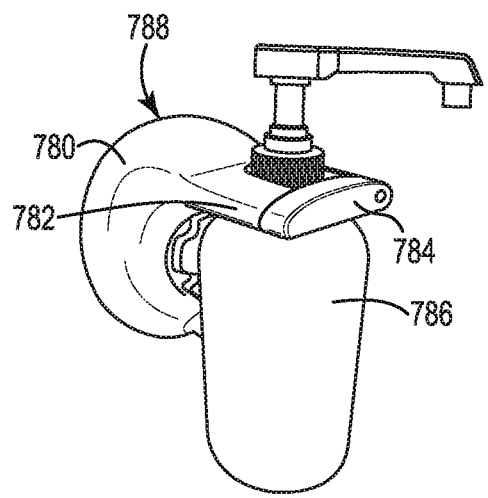
FIG. 20C

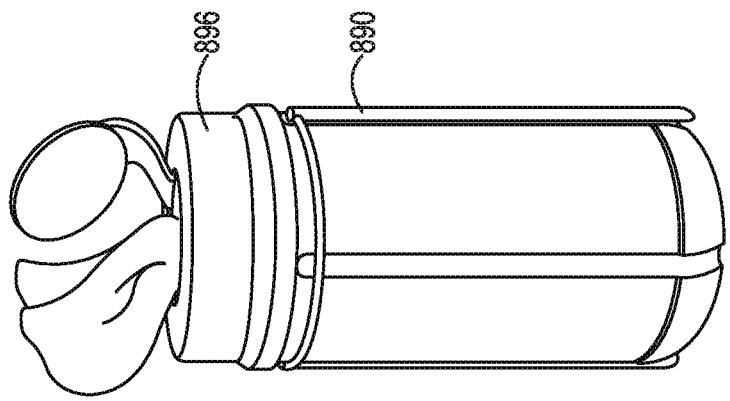
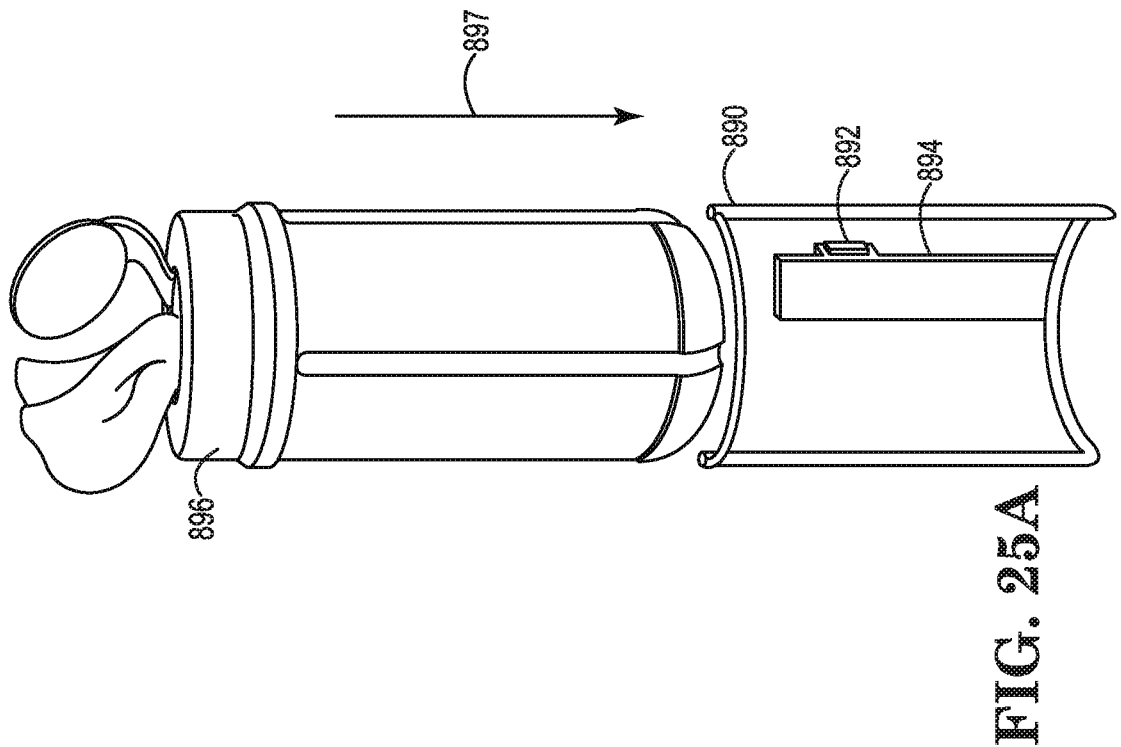

FLEXIBLE MOUNTING SYSTEM FOR HAND HYGIENE DISPENSERS

CROSS-REFERENCE TO RELATED APPLICATIONS

This application is a continuation of U.S. application Ser. No. 16/883,169, filed May 26, 2020, entitled, FLEXIBLE MOUNTING SYSTEM FOR HAND HYGIENE DISPENSERS, which is a continuation of U.S. application Ser. No. 16/023,974, filed Jun. 29, 2018, and issued as U.S. Pat. No. 10,667,654 on Jun. 2, 2020, entitled, FLEXIBLE MOUNTING SYSTEM FOR HAND HYGIENE DISPENSERS, which is a continuation of U.S. application Ser. No. 15/088,751, filed Apr. 1, 2016, and issued as U.S. Pat. No. 10,039,423 on Aug. 7, 2018, entitled FLEXIBLE MOUNTING SYSTEM FOR HAND HYGIENE DISPENSERS, which claims the benefit of U.S. Provisional Application No. 62/141,629, filed Apr. 1, 2015, entitled, "FLEXIBLE MOUNTING SYSTEM FOR HAND HYGIENE DISPENSERS," all of which are incorporated by reference herein in their entirety.

BACKGROUND

Product dispensers are used for a variety of purposes and for a variety of applications. For example, hand hygiene product dispensers are often used in health care and food service settings to reduce pathogen transmission that may lead to the spread of illness. Compliance with hand hygiene guidelines is considered the most effective action health care workers can take to reduce pathogen transmission in health care settings. To facilitate compliance with hand washing procedures, hand hygiene product dispensers should be readily available so that hand washing is easy and convenient. For example, hand hygiene products, such as liquid, foam, or gel hand washing soaps, may be placed near sinks or other hand washing stations in a healthcare or restaurant setting to facilitate hand washing. Other types of hand hygiene products, such as waterless hand sanitizers, may also be placed in and around healthcare or restaurant settings. However, the wide variety of environments in which such dispensers are used means that mounting of the dispenser in a convenient location may sometimes be difficult.

SUMMARY

In general, the disclosure provides a product dispenser mounting system including a dispenser holder and at least one mounting apparatus. The dispenser holder may be attached to the mounting apparatus by means of a releasable connection mechanism. In some examples, the releasable connection mechanism provides for attachment of the dispenser holder to the mounting apparatus in multiple orientations. In one example, the mounting apparatus includes a mounting bracket configured for mounting to a support object, such as a wall, table, or counter top, cabinet, shelf, cart, etc. In another example, the mounting apparatus includes a mounting clamp configured for mounting to ledges, poles, bedrails, handles, etc.

In one example, the disclosure is directed to a product dispenser mounting system comprising a dispenser holder, the dispenser holder including a dispenser holder body configured to receive a product dispenser, the dispenser holder body further including a sidewall having a front surface and a back surface, and a back plate positioned proximate the back surface of the sidewall, the back plate further including a first aperture, and a latch positioned between the back plate and the back surface of the sidewall, the latch including a second aperture, the walls of the second aperture defining a locking side and an unlocking side, the latch further moveable between a first locked position and a second unlocked position, and a mounting clamp configured for fixedly mounting on a support object, the mounting clamp including a first jaw providing a first inward clamping surface, a second jaw having a proximal end pivotally attached to a proximal end of the first jaw, the second jaw providing a second inward clamping surface, the first jaw and the second jaw moveable with respect to each other to apply a clamping force to the support object, and an attachment post including a base portion having a shape configured to fit within the first aperture of the back plate in one or more orientations, and a post portion extending outwardly from a top surface of the first jaw, the post portion including a cap having a diameter that is relatively larger than a diameter of the post portion, the cap further providing a bottom locking surface, such that when the base portion of the attachment post is fit within the first aperture of the back plate, the walls of the second aperture defining the locking side engage the bottom locking surface of the cap when the latch is in the first locked position.

In some examples, the base portion of the attachment post and the first aperture both has a shape comprising a regular n-sided polygon such that dispenser holder is maintained in a selected one of the one or more orientations when the dispenser holder is connected to the attachment post. In some examples, the base portion of the attachment post has a size and a shape configured to fit within the first aperture in one or more orientations such that dispenser holder is maintained in a selected one of the one or more orientations when the dispenser holder is connected to the attachment post.

In another example, the disclosure is directed to A mounting clamp configured for fixedly mounting on a support object, the mounting clamp comprising a first jaw providing a first inward clamping surface, a second jaw having a proximal end pivotally attached to a proximal end of the first jaw, the second jaw providing a second inward clamping surface, the first jaw and the second jaw moveable with respect to each other to apply a clamping force to the support object, and an attachment post including a base portion having a shape configured to fit within a first aperture of the back plate in one or more orientations, and a post portion extending outwardly from a top surface of the first jaw, the post portion including a cap having a diameter that is relatively larger than a diameter of the post portion, the cap further providing a bottom locking surface.

In some examples, the base portion of the attachment post has a shape comprising a regular n-sided polygon and sized to cooperate with an aperture of a dispenser holder such that the dispenser holder is maintained in a selected one of the one or more orientations when the attachment post is received into the aperture of the dispenser holder.

The details of one or more examples are set forth in the accompanying drawings and the description below. Other features will be apparent from the description and drawings, and from the claims.

BRIEF DESCRIPTION OF DRAWINGS

FIGS. 3A-3B are perspective views of a top portion of the example dispenser holder of FIGS. 1 and 2, showing the first and second arms at a first, lowered position (FIG. 3A) and at a second, raised position (FIG. 3B).

FIGS. 3C-3D are cross-sectional side views of a top portion of the example dispenser holder of FIGS. 1 and 2, showing the first and second arms at a first, lowered position (FIG. 3C) and at a second, raised position (FIG. 3D).

FIG. 8 is an interior view illustrating the fitting of an example mounting bracket 200 and back plate 126 of an example dispenser holder.

FIG. 9 is a side cross-sectional view of an example dispenser holder releasably connected to an example mounting clamp.

FIGS. 15A-15E show another example of a mounting bracket; FIGS. 15F-15I show the mounting bracket of FIGS. 15A-15E and another example dispenser holder.

FIGS. 20A-20C show other example product holders.

FIGS. 25A and 25B show another example product holder.

DETAILED DESCRIPTION

In general, the disclosure provides a product dispenser mounting system including a dispenser holder and at least one mounting apparatus. The dispenser holder may be attached to the mounting apparatus by means of a releasable connection mechanism. The releasable connection mechanism provides for attachment of the dispenser holder to the mounting apparatus in multiple orientations. In one example, the mounting apparatus includes a mounting bracket configured for mounting to a substantially flat surface, such as a wall, table, or counter top, cabinet, shelf, etc. In another example, the mounting apparatus includes a mounting clamp configured for mounting to ledges, poles, bedrails, handles, etc.

The product dispenser mounting system described herein may provide several advantages. For example, the product dispenser mounting system provides flexible options for mounting of a product dispenser in a wide variety of environments and on a wide variety of support objects. As another example, the product dispenser mounting system in accordance with the present disclosure is low profile and designed to comply with relevant state and federal regulations such as the 2010 ADA Standards for Accessible Design (e.g., that objects may not protrude more than 4 inches (100 mm) horizontally into the circulation path.

Figure 1A:
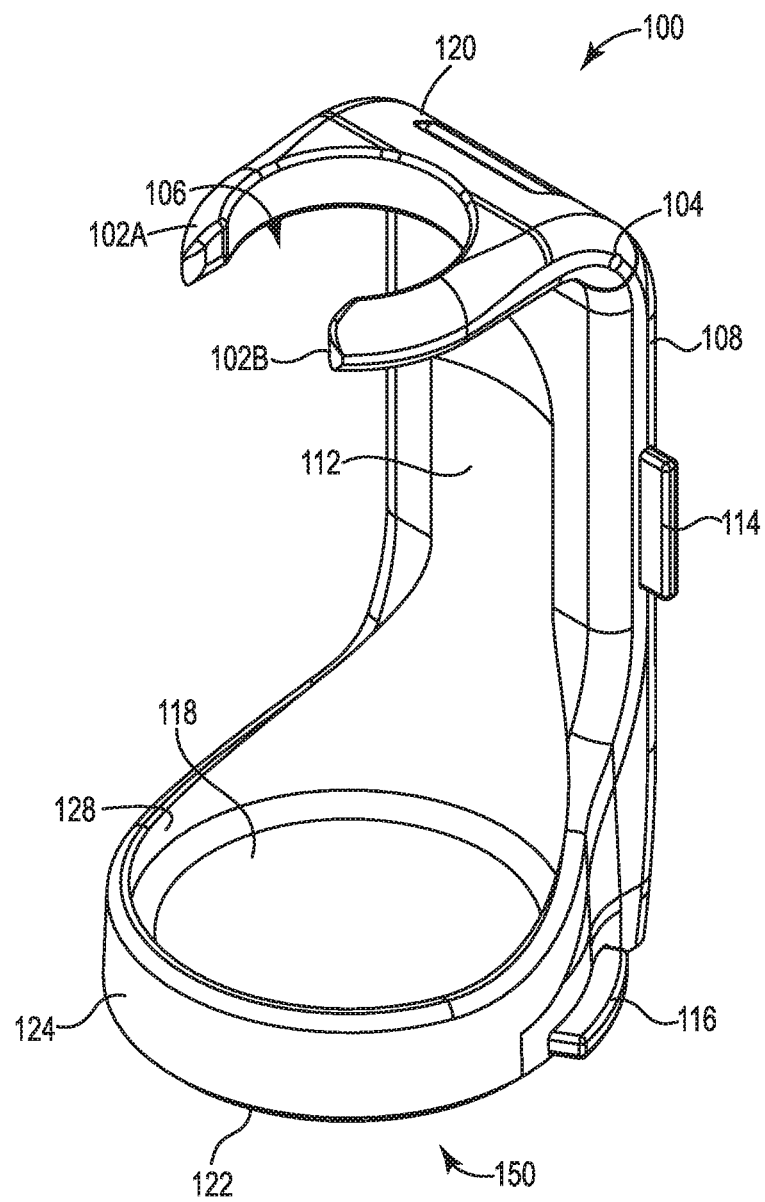
FIG. 1A is a front perspective view of an example dispenser holder in accordance with one or more aspects of the present disclosure.
Figure 1B:
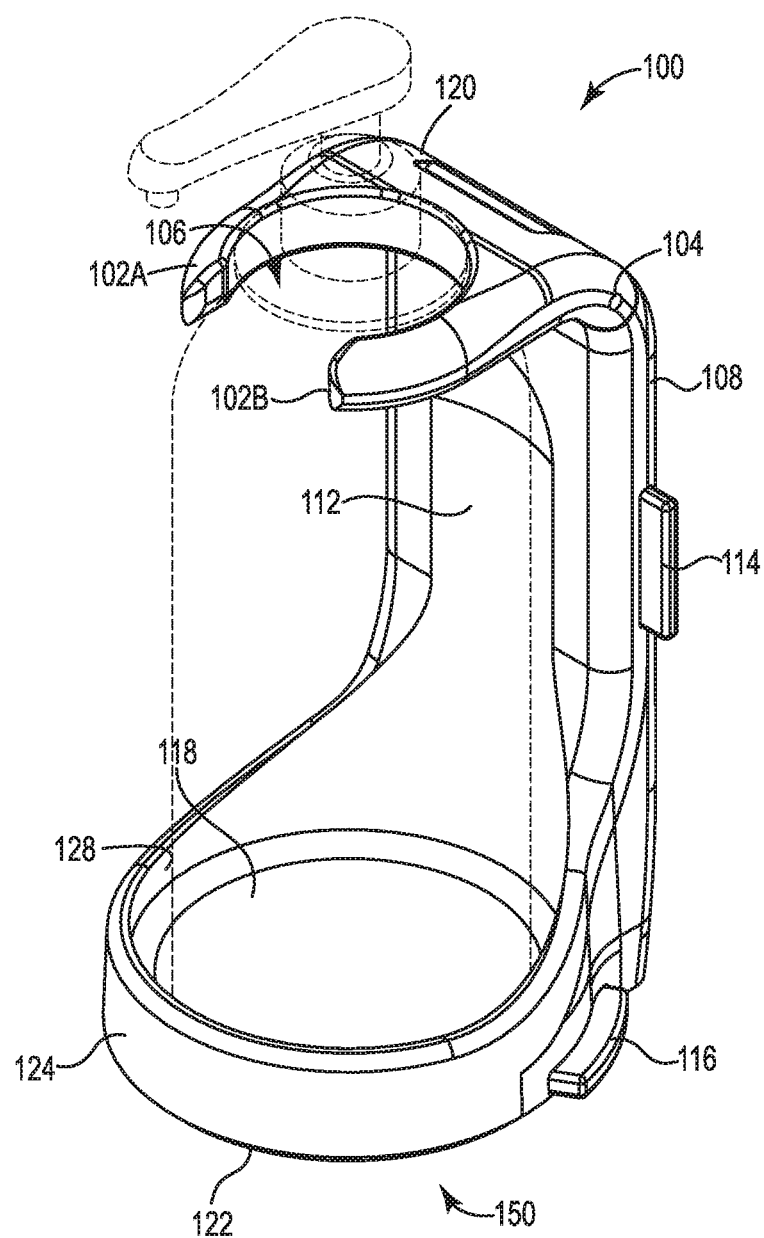
FIG. 1B is a front perspective view of the example dispenser holder of FIG. 1A and including an example product dispenser.
Figure 2A:
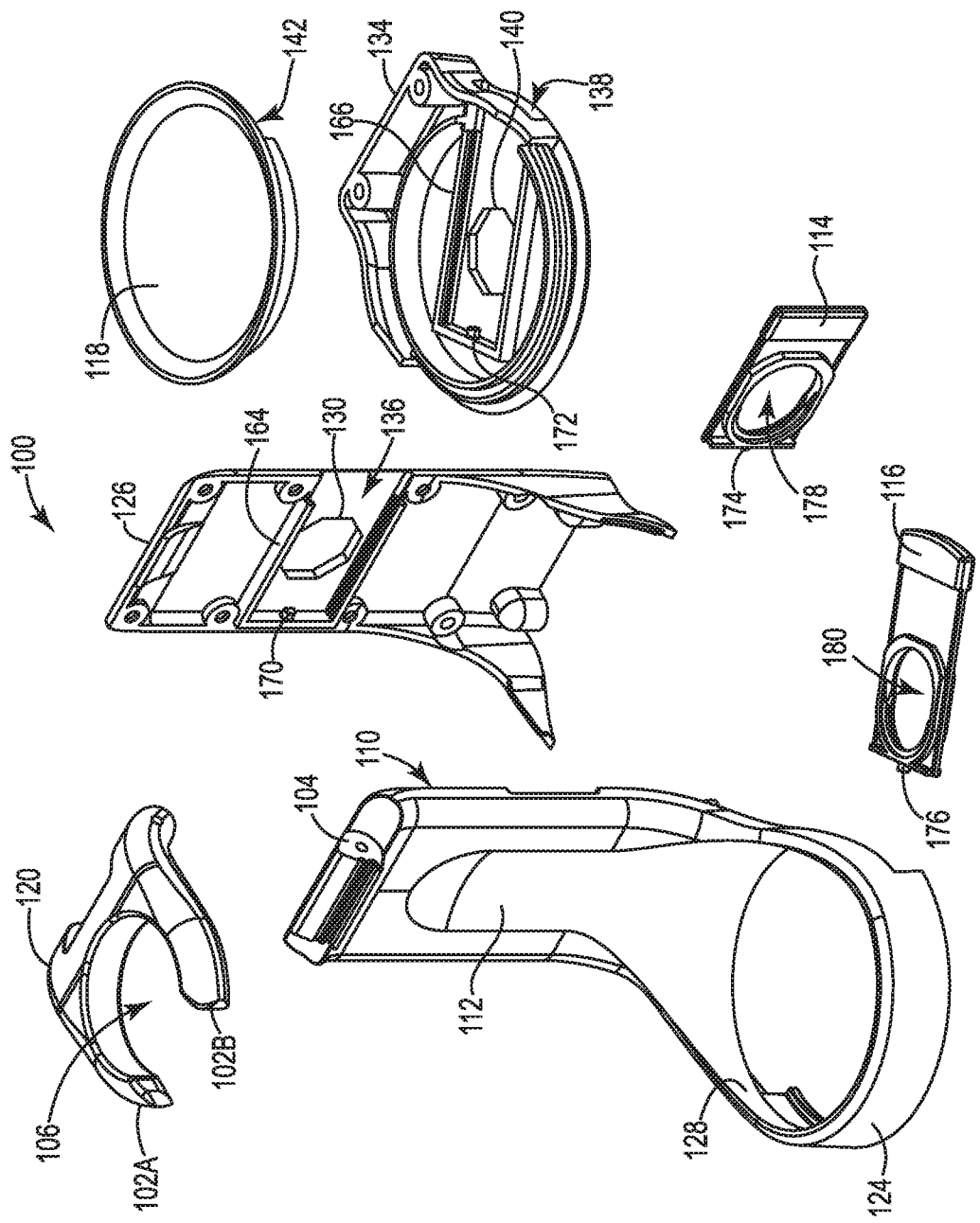
FIG. 2A is an exploded perspective view of the example dispenser holder of FIG. 1.

Referring now to FIGS. 1A-1B, and 2A, FIG. 1A is a perspective view of an example dispenser holder 100 in accordance with one or more aspects of the present disclosure. FIG. 1B is a front perspective view of the example dispenser holder of FIG. 1A and including an example product dispenser 101 in the form of a manual pump bottle. FIG. 2A is an exploded perspective view of the dispenser holder 100 of FIG. 1A. In the examples described herein, product dispenser 101 is shown and described as being a manual pump bottle; however, it shall be understood that the dispenser holders described herein may be adapted for any type of product dispenser, including manual pump bottles, trigger sprayers, pump sprayers, pressure sprayers, canisters, containers that dispense or contain cleansing or sanitizing wipes, or any other type of product dispenser, and that the disclosure is not limited in this respect.

Dispenser holder 100 includes a dispenser holder body 108 including a sidewall 112, a top portion 120, and a bottom portion 124. A front side of sidewall 112 may be concave to at least partially receive a product dispenser, such as the bottle portion of a manual pump-type product dispenser, as shown in FIG. 1B, so as to provide a lower profile in the horizontal direction when dispenser holder 100 is mounted to a support object. Top portion 120 includes first and second arms 102A and 102B, respectively, extending outwardly relative to sidewall 112 of dispenser body 108. In this example, first and second arms 102A and 102B curve inwardly toward the center of dispenser holder 100 to form a generally C-shaped collar forming a receiving area 106. Receiving area 106 is sized to receive at least a portion of product dispenser 101, such as the neck of a manual pump bottle containing a hand hygiene product. Top portion 120 is pivotally connected to the sidewall 112 of dispenser holder body 108 by means of a hinge 104 to permit raising and lowering of first and second arms 102A and 102B between a first, lowered position (as shown in FIGS. 1A and 1B) and a second, raised position. In the first, lowered position, arms 102A and 102B secure a product dispenser within dispenser holder 100. When in the second, raised position, arms 102A and 102B permit removal from and/or replacement of a product dispenser into the dispenser holder 100.

A base 118 is sized to fit within interior sidewalls 128 of bottom portion 124 and is configured to support a product dispenser installed in dispenser holder 100. When properly installed into dispenser holder 100, a product dispenser, such as a manual pump bottle, is held in position by first and second arms 102A and 102B, interior sidewalls of base portion 124, and base plate 118. One or more removable shims that fit within the collar formed by first and second arms 102A and 102B may also be included to provide a good fit for multiple sizes or types of product dispensers. Base 118 may also be sized and/or shaped so as to fit one or more different sizes or shapes of product dispensers, or multiple bases may be provided, each configured to hold a differently sized or shaped product dispenser.

Dispenser holder body 108 may be adapted to hold various types of product dispensers, and the size and shape of the dispenser holder body may be changed to suit those various types of product dispensers, including manual pump bottles, trigger sprayer bottles, pump sprayers, pressure sprayers, canisters, containers that dispense or contain cleansing and/or sanitizing wipes, etc., and it shall be understood that the disclosure is not limited in this respect.

Example dispenser holder 100 further includes a back plate 126 adapted to be attached to a back side 110 of sidewall 112. The attachment may be by screws, snap-fit, or other attachment mechanism. In other examples, back plate 126 may be integrally molded with the sidewall 112 to form a single piece. Likewise, a base plate 134 is adapted to be attached to a bottom side 150 of dispenser holder 100. In this example, base plate 134 fits within bottom portion 124 and may be held in place by means of screws, snap-fit, tongue and groove, adhesive, ultrasonic welding, or other means of attachment to the back plate 126.

Both back plate 126 and base plate 134 include an aperture 130, 140, respectively. Each aperture 130, 140 forms part of a releasable connection mechanism by which dispenser holder 100 may be connected to a mounting apparatus. In this way, a mounting apparatus may be connected to the back of dispenser holder 100 or to the bottom of dispenser holder 100. In the examples shown and described herein, apertures 130 and 140 are generally octagon-shaped. The octagonal shape of apertures 130 and 140 permits attachment of dispenser holder 100 to a mounting apparatus in multiple orientations, in this example at 45 degree intervals, as will be described herein further below. It shall be understood, however, that apertures 130 and/or 140 may be any n-sided geometric shape, including any regular n-sided polygon, such as a triangle, a square, a rectangle, a pentagon, a hexagon, an octagon, a star polygon, or any other geometry, such as a clover-leaf shape, wheel locks, and that the disclosure is not limited in this respect.

Release tabs 114 and 116 fit within slots 136 and 138, respectively, which are formed when dispenser holder 100 is fully assembled. Release tab 114 includes an asymmetrical aperture 178 having a first, narrow end 171 and a second, wider end 173. Release tab 116 includes an asymmetrical aperture 180 having a first, narrow end 175 and a second, wider end 177.

Release tabs 114 and 116 slide along and are retained by guide rails 164 and 166, respectively. Back plate 126 and base plate 134 may include posts 170 and 172, respectfully, each of which may receive one side of a spring when the dispenser holder is fully assembled (springs not shown in FIG. 2A). The other side of these springs may be received by posts 174 and 176 of release tabs 114 and 116, respectively. When assembled, depression of one of release tabs 114 or 116 releases the dispenser holder from the releasable connection to the mounting apparatus. For example, when the back of dispenser holder is connected to a mounting apparatus, the connection may be released using release tab 114. When the bottom of dispenser holder is connected to a mounting apparatus, the connection may be released using release tab 116. Further details concerning the releasable connection mechanism in accordance with one or more aspects of the present disclosure are described herein further below. The function of the springs on release tabs 114, 116 may also be implemented by taking advantage of the elastic properties of plastic by providing a molded flexible member implemented during the injection molding process.

Figure 2B:
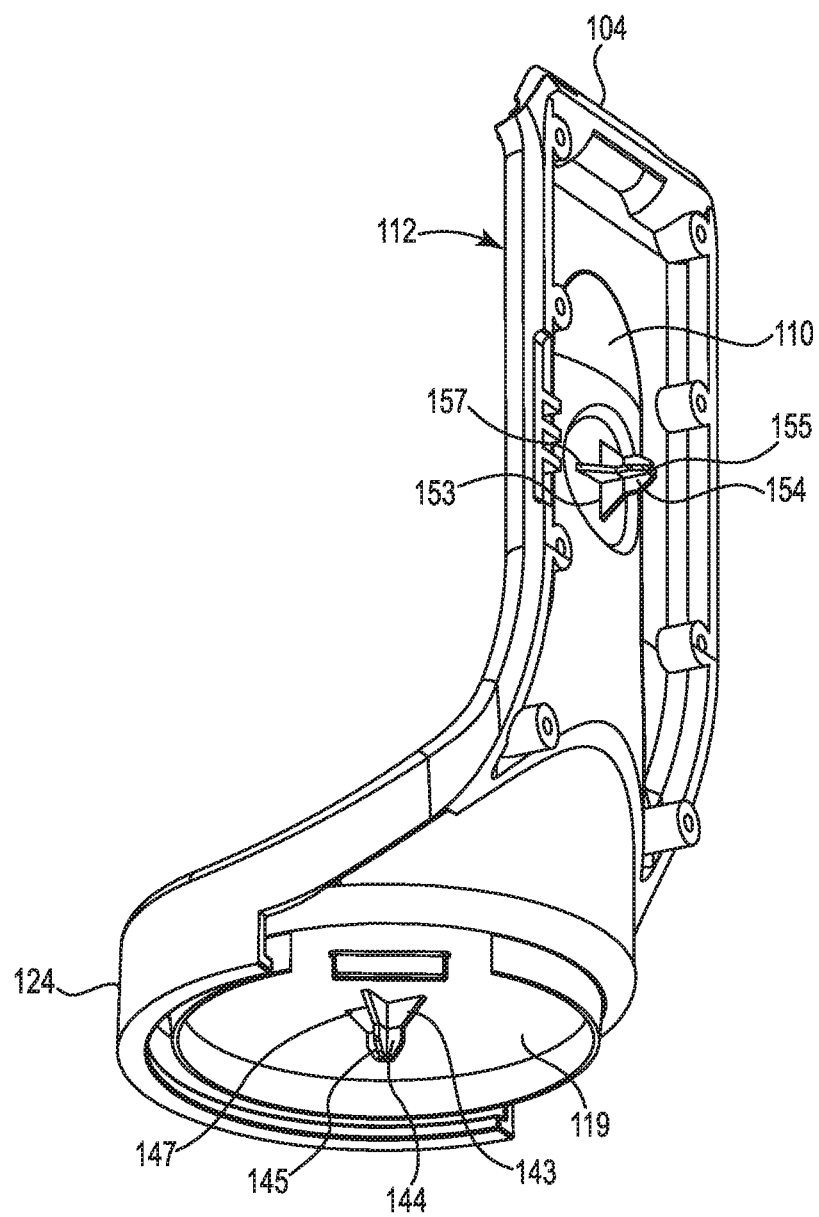
FIG. 2B is a back perspective view of the sidewall of the example dispenser holder of FIG. 2A.

FIG. 2B is a perspective view illustrating the back surface 110 of sidewall 112 and the bottom surface 119 of base plate 118. Back surface 110 includes an alignment projection 154 and bottom surface of base plate 118 includes a tapered projection 144. Each projection 154 and 144 includes a tapered tip 155, 145 and a tapered base section 157, 147, respectively. For each projection 154, 144, the diameter of the base 157, 147, is relatively wider than the diameter of the tip 155, 145. In this example, projections 154 and 144 further include one or more vanes 153, 143; however, it shall be understood that projections 154 and 144 may also be smoothly sided, and that that disclosure is not limited in this respect. The purpose of tapered projections 154, 144 is to help guide and align the mating halves of the releasable connection as the dispenser holder 100 is loaded onto a mounting apparatus, as further described herein below.

Figure 2C:
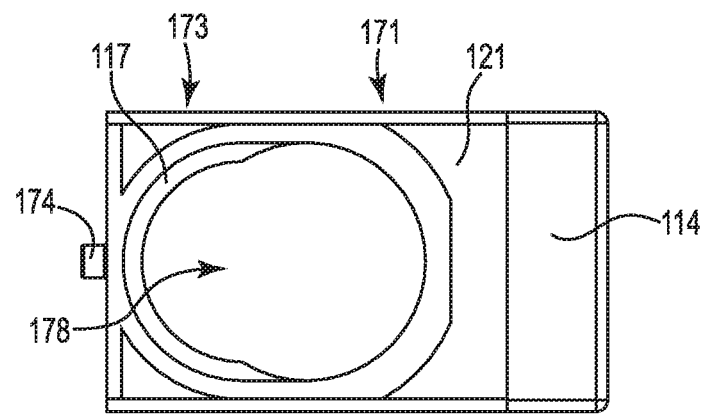
FIGS. 2C and 2D are top and bottom views of an example release tab.
Figure 2D:
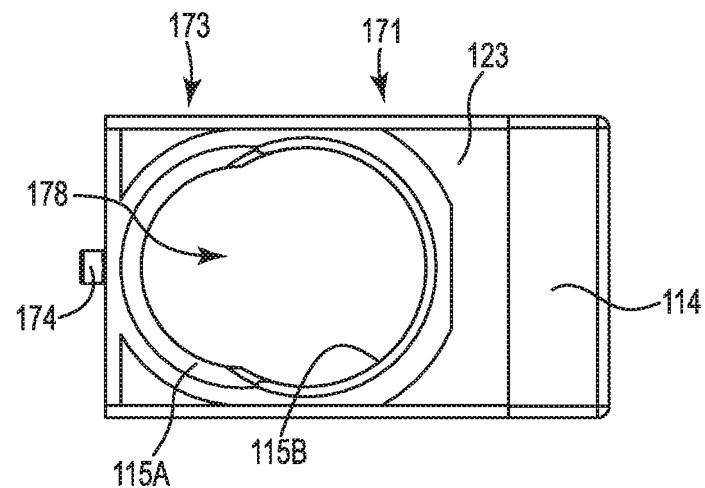

FIGS. 2C and 2D are top and bottom views, respectively, of an example release tab, such as release tab 114. It shall be understood that any other release tabs on dispenser holder 100, such as release tab 116, may have the same design specifications as those shown in FIGS. 2A, 2C, and 2D. Example release tab 114 includes a top surface 121, a bottom surface 123, aperture 178, and post 174. Aperture 178 is asymmetrical in the sense that aperture 178 includes a first, wider side 171 that is relative wider than a second, narrower side 173. On the bottom surface 123 of release tab 114, a tapered wall 115 is provided around at least a portion of the perimeter of aperture 178. On the top surface 121 of release tab 114, a locking edge 117 is provided on at least a portion of the circumference on second, narrower side 173 of aperture 178. Tapered wall 115 and locking edge 117 cooperate with a mating half of the releasable connection to provide for auto-loading of the dispenser holder onto a mounting apparatus, as further described herein below.

FIGS. 3A-3B are perspective views of top portion 120 of dispenser holder 100. Specifically, FIGS. 3A-3B are perspective views of a top portion 120 of the dispenser holder 100 of FIGS. 1 and 2, showing the first and second arms 102A and 102B at a first, lowered position (FIG. 3A) and at a second, raised position (FIG. 3B). FIGS. 3C-3D are cross-sectional side views of top portion 120 of the dispenser holder 100 of FIGS. 1 and 2, showing the first and second arms 102A and 102B at a first, lowered position (FIG. 3C) and at a second, raised position (FIG. 3D). As may be seen in FIGS. 3C and 3D, hinge 104 further includes a first hinge section 184 forming a piece with sidewall 112 and back plate 126 and a second hinge section 186 forming a piece with top portion 120. First hinge section 184 includes two detents 182A and 182B. Detent 182A is associated with top portion 120 in the first, lowered position. Detent 182B is associated with top portion 120 in the second, raised position. Second hinge section 186 includes a flexible tab 180 sized to fit within detents 182A and 182B. Interaction between flexible tab 180 and detent 182A or 182B provides positive stopping locations for the lowered (182A) and raised (182B) positions, and also retains the top portion 120 in either the lowered or raised position. Thus, interaction between flexible tab 180 and detent 182B holds top portion 120 in the second, raised position for product dispenser bottle removal and replacement. Interaction between flexible tab 180 and detent 182A holds top portion 120 in the first, lowered position, thus helping to retain product dispenser within dispenser holder 100.

Figure 4:
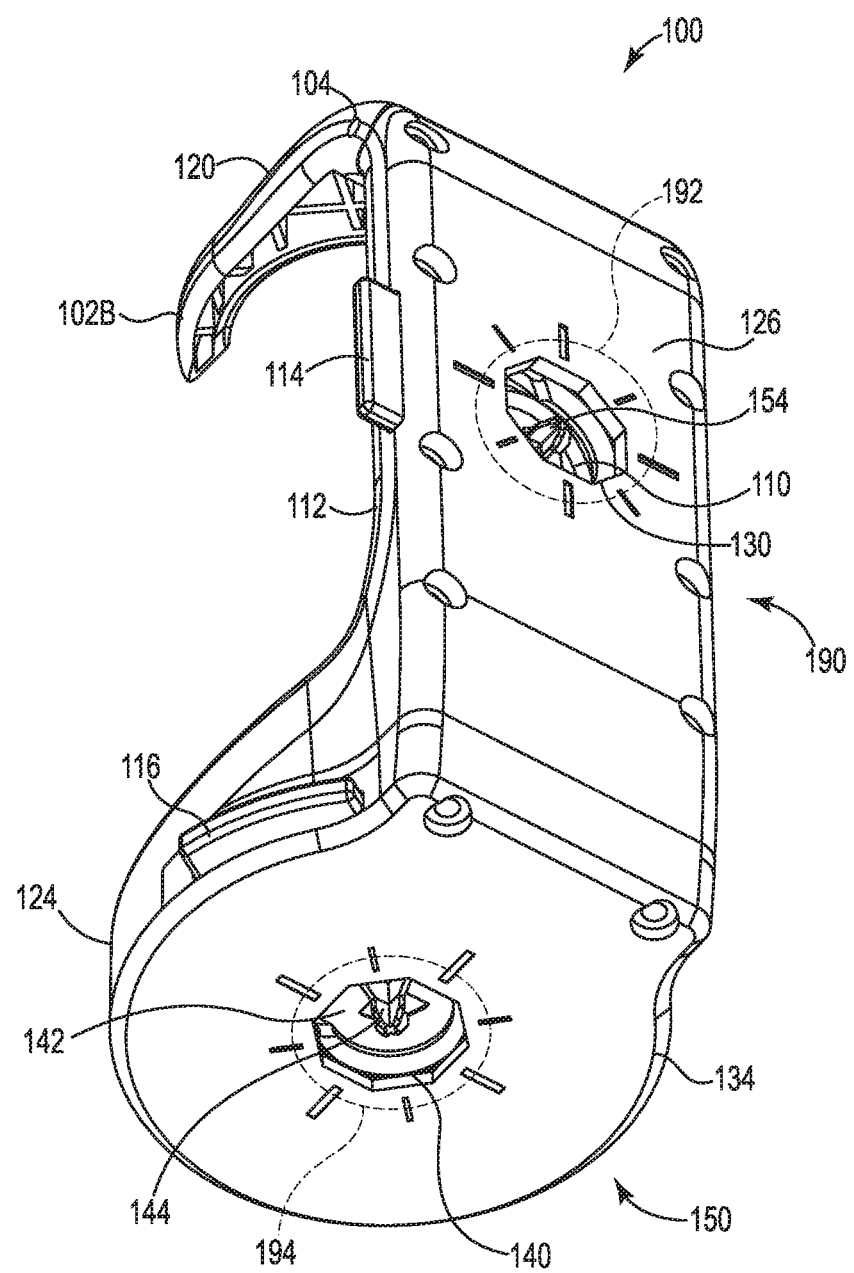
FIG. 4 is a back perspective view of the example dispenser holder of FIGS. 1 and 2.

FIG. 4 is a back perspective view of the example dispenser holder 100 of FIGS. 1 and 2. Dispenser holder 100 includes a back side 190 and a bottom side 150. This view illustrates that, when assembled, the back side surface 110 of sidewall 112 (see FIG. 2) is visible through aperture 130 of back plate 126. Projection 154 is also visible through aperture 130 of back plate 126. Projection 154 extends outwardly from the back side surface 110 of sidewall 112 and is substantially concentrically aligned with aperture 130. Projection 154 and aperture 130 comprise a first connector clip indicated generally by reference numeral 192. First connector clip 192 is configured to releasably connect with a corresponding mating attachment post provided by a mounting apparatus, as shown and described below.

Similarly, the bottom surface 142 of base 118 (see FIG. 2) is visible through aperture 140 of base plate 134. Projection 144 is also visible through aperture 140 of base plate 134. Projection 154 extends outwardly from the bottom surface 142 of base 118 and is aligned substantially in the center of aperture 140. Aperture 130 and projection 154 comprise a second connector clip indicated generally by reference numeral 194. As with first connector clip 192, second connector clip 194 is configured to releasably connect with a corresponding mating attachment post provided by a mounting apparatus, as shown and described below.

First connector clip 192 and second connector clip 194 thus provide alternative connection options that provide flexibility in mounting of the dispenser holder in a wide variety of environments. For example, dispenser holder may be mounted on a support object, such as a wall, cabinet, pole, post, or other substantially vertical support object using first connector clip 192. As another example, dispenser holder 100 may be mounted on a counter, shelf, medical cart, table, or other substantially horizontal support object using second connector clip 194. In addition, the octagonal geometry of apertures 130 and 140 provide for rotatable mounting of dispenser holder at 45 degree intervals, as further described herein below, thus allowing dispenser holder 100 to be mounted on support objects that are not substantially vertical or horizontal while still maintaining the dispenser holder in an upright position for dispensation of the product.

Figure 5:
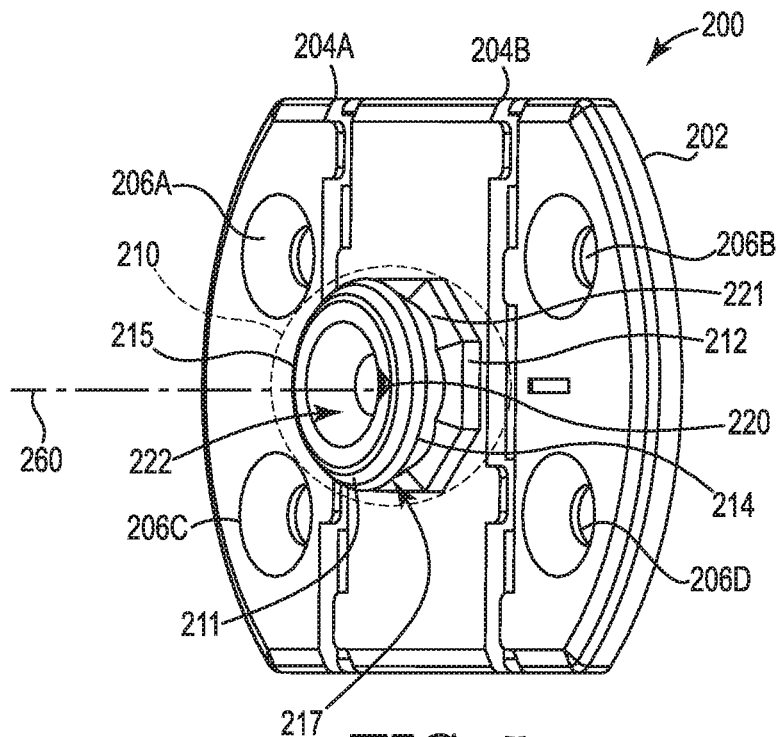
FIG. 5 is a perspective view of an example mounting bracket in accordance with one or more aspects of the present disclosure.

FIG. 5 is a perspective view of an example mounting bracket 200 in accordance with one or more aspects of the present disclosure. Mounting bracket 200 includes a base plate 202 and an attachment post indicated generally by reference numeral 210. In this example, base plate 202 includes one or more screw holes 206A-206D for screw mounting the mounting bracket 200 to a support object, such as a wall, table, counter, cabinet, or other substantially flat surface. Base plate 202 also includes one or more channels 204A-204B by which mounting bracket 200 may be attached to a support object using one or more cable or zip ties, straps or other type of mechanical fastener. Mounting bracket 200 may also be adhesively mounted to any substantially flat surface.

Base plate 202 may also include one or more hinges that permit mounting bracket 200 to conform to additional contoured surfaces, such as around corners or on rounded surfaces. The hinges may be, for example, a thin flexible hinge or flexible bearing made from the same material as the base plate 202. The hinge may be a living hinge produced in an injection molding operation that creates the hinge and the base plate 202 at one time and as a single piece. For example, base plate 202 may be thinned or cut along one or more of channels 204 to allow the rigid sections of base plate 202 to bend along the line of the hinge. In another example, the hinge may be formed of some other flexible substance and attached to the pieces of the base plate 202 in the desired location to form a conformable mounting bracket 200.

Attachment post 210 includes a base portion 212 and a post portion 214. Post portion 214 further includes a cap 215 and a shaft extending from the cap and defining a center longitudinal axis 260 for the attachment post 210. A top side of cap 215 includes a tapered edge 211 and a bottom side of cap 215 provides a locking surface 217. In this example, base portion 212 includes tapered shoulders 221 and has complementary geometry to the geometry of apertures 130/140. In some examples, the base portion 212 may have the same general geometry as apertures 130/140. To that end, in this example, base portion 212 is substantially octagonal in shape. In general, base portion 212 is sized and shaped to fit within apertures 130 and 140 of dispenser holder 100 such that dispenser holder 100 may be not be rotated around the longitudinal axis 260 once the dispenser holder is loaded onto attachment post 210. As discussed above, although apertures 130 and 140 and base portion 212 of attachment post are described as being octagonal in shape, it shall be understood, however, that apertures 130 and/or 140 and base portion 212 of attachment post 210 may be any n-sided geometric shape, including any regular n-sided polygon, such as a triangle, a square, a rectangle, a pentagon, a hexagon, an octagon, a star polygon, or any other shape, such as clover-leaf shape, wheel lock or any other geometry, and that the disclosure is not limited in this respect. In addition, although the apertures and attachment posts are shown in these examples as having the same geometry, they may have different but complementary geometries, and again the disclosure is not limited in this respect. In some examples, complementary geometries include geometries that are sized and shaped to fit within one another and provide the locking function in one or more orientations as described herein.

Base portion 212 and post portion 214 may be integrally molded with base plate 202 to form a single piece. Attachment post 210 further includes a bore 222 extending through the center longitudinal axis 260 of base portion 212 and post portion 214, and in this example also extends through base plate 202. Bore 222 is sized to receive one of projections 144 and 154 of connector clips 194 and 192, respectively. As mentioned above, octagonal base portion 212 and octagonal apertures 130, 140 provide for mounting of dispenser holder 100 at 45 degree intervals without repositioning of mounting bracket 200. This helps to provide flexible mounting options for the dispenser holder on a wide variety of support objects.

Figure 6:
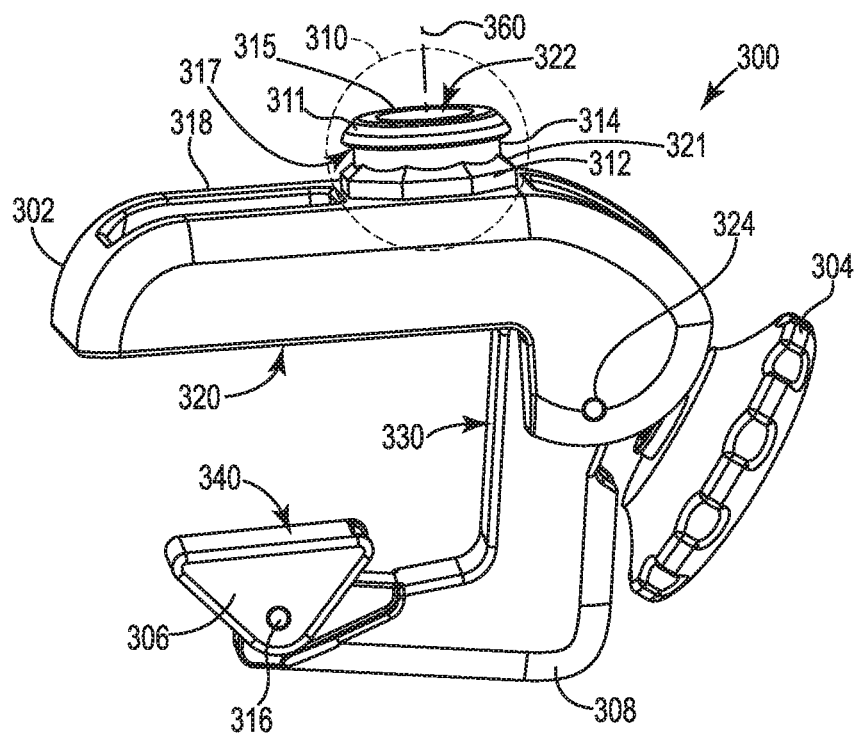
FIG. 6 is a perspective view of an example mounting clamp in accordance with one or more aspects of the present disclosure.

FIG. 6 is a perspective view of an example mounting clamp 300 in accordance with one or more aspects of the present disclosure. Mounting clamp 300 includes a first jaw 302 having a first inward clamping surface 320, an L-shaped second jaw 308 having a second inward clamping surface 330, and a pivotable tip 306 having a third inward clamping surface 340. First jaw 302 further includes an attachment post 310 extending outwardly away from a top surface 318.

Attachment post 310 includes a base portion 312 and a post portion 314. Post portion 314 further includes a cap 315 and a shaft extending from the cap and defining a center longitudinal axis 360 for the attachment post 310. A top side of cap 315 includes a tapered surface 311 and the bottom side of cap 315 provides a locking surface 317.

Attachment post 310 includes a base portion 312 and a post portion 314. Post portion 314 further includes a cap 315 and a shaft extending from the cap and defining a center longitudinal axis 360 for the attachment post 310. A top side of cap 315 includes a tapered surface 311 and the bottom side of cap 315 provides a locking surface 317. Base portion 312 includes tapered shoulders 321 and has the same general geometry as apertures 130/140. To that end, in this example, base portion 312 is substantially octagonal in shape. In general, base portion 312 is sized to fit within apertures 130 and 140 of dispenser holder 100 such that dispenser holder 100 may be not be rotated around the longitudinal axis 360 once the dispenser holder is loaded onto attachment post 310. As discussed above, although apertures 130 and 140 and base portion 312 of attachment post are described as being octagonal in shape, it shall be understood, however, that apertures 130 and/or 140 and base portion 312 of attachment post 310 may be any n-sided geometric shape, including any regular n-sided polygon, such as a triangle, a square, a rectangle, a pentagon, a hexagon, an octagon, a star polygon, or any other multi-faceted or n-sided polygon, and that the disclosure is not limited in this respect. Base portion 312 and post portion 314 may be integrally molded with first arm 302 to form a single piece. Attachment post 310 further includes a bore 322 extending through the center of base portion 312 and post portion 314, and in this example also extends through the top surface 318 of first jaw 302. Bore 322 is sized to receive one of projections 144 and 154 of connector clips 194 and 192, respectively. Attachment post 310 of mounting clamp 300 is of substantially the same geometry and dimensions as attachment post 210 of mounting bracket 200, and thus is similarly configured to releasably attach to one of connector clips 192 and/or 194. As mentioned above, octagonal base portion 312 and octagonal apertures 130, 140 provide for mounting of a dispenser holder 100 at 45 degree intervals without repositioning of mounting clamp 300. This helps to provide flexible mounting options for the dispenser holder on a wide variety of support objects.

First jaw 302 of mounting clamp 300 is pivotally attached at a proximal end to a proximal end of L-shaped second jaw 308 by means of an adjustable hinge 324. A thumb knob 304 permits pivotal adjustment of hinge 324 to open and close first and second jaws 302, 308. Thumb knob 304 may operate by means of a threaded screw adjustment or other mechanism for thumb knob adjustment. Pivotable tip 306 is pivotally attached to a distal end of second jaw 308 by hinge 316. The combination of first clamping surface 320, second clamping surface 330, and third clamping surface 340 provide for 2-point parallel clamping of surfaces such as tables and countertops, and also provides for 3-point clamping of rounded surfaces such as poles.

When mounting to a counter, ledge, or table, for example, the first clamping surface 320 and the third clamping surface 340 may engage the opposed top and bottom surfaces of the table. As another example, when mounting to a pole, bedrail, cart handle, IV pole, etc., the first clamping surface 320, second clamping surface 340, and third clamping surface 340 may provide three points of contact with the pole. The 3-points of contact may provide better clamping retention on poles and/or other rounded support objects, and may help to reduce spinning of the mounting clamp 300 around and/or down a pole, and thus reduce undesirable movement of any dispenser holder 100 mounted to the mounting clamp.

First, second, and/or third clamping surfaces 320, 330, and 340, respectively, may be ridged, grooved, or otherwise textured to provide an improved grip with a support object. Alternatively, the first, second, and/or third clamping surfaces 320, 330, and 340, respectively, may include a tacky surface layer, such as rubber, or other means of providing an improved grip.

Figure 7:
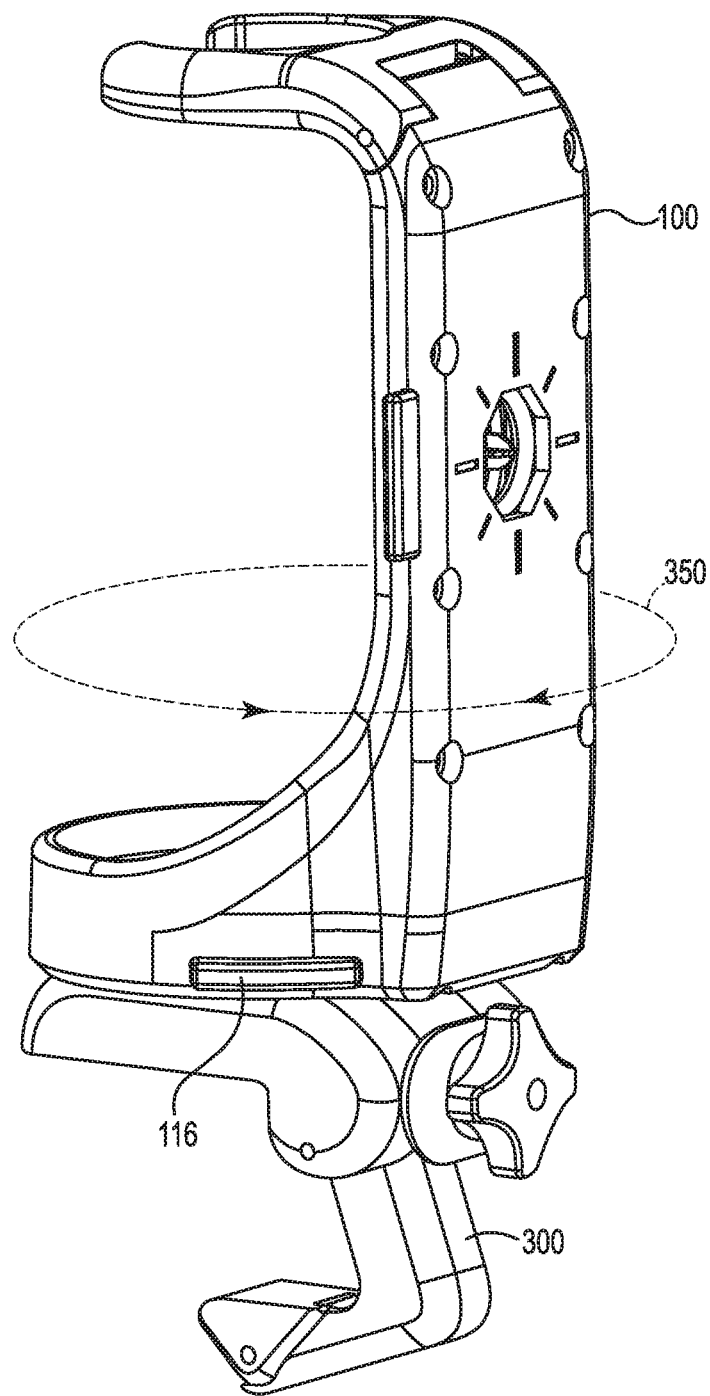
FIG. 7 is a perspective view of an example dispenser holder of FIGS. 1 and 2 attached to the example mounting clamp of FIG. 6.

FIG. 7 is a perspective view of an example dispenser holder of FIGS. 1 and 2 attached to the example mounting clamp of FIG. 6. In this example, dispenser holder 100 is releasably connected to attachment post 310 of mounting clamp 300 using second connector clip 194 located on the bottom side of dispenser holder 100. In this configuration, dispenser holder 100 may be mounted at 45 degree intervals around the axis 360 of attachment post 310 (see FIG. 6) as indicated by arrows 350. In another example, dispenser holder 100 may be releasably connected to mounting clamp 300 using first connector clip 192. In another example, dispenser holder 100 may be releasably connected to a mounting bracket 200 using first connector clip 192 or second connector clip 194. In any of these configurations, dispenser holder may be mounted at 45 degree intervals around the axis 360 of attachment post 310 of mounting clamp 300 or axis 260 of attachment post 210 of mounting bracket 200.

In the configuration of FIG. 7, dispenser holder 100 may be releasably detached from mounting clamp 300 using release tab 116. Actuation of release tab 116 releases connector clip 194 from attachment post 310 of mounting clamp 300, thus permitting dispenser holder 100 to be removed from the mounting clamp 300. Dispenser holder 100 may then be reattached at a different 45 degree orientation using connector clip 194 and attachment post 310, may be attached to mounting clamp 300 using first connector clip 192, or may be attached to a different mounting clamp or mounting bracket using either of first connector clip 192 or second connector clip 194.

FIG. 8 is an interior view illustrating the fitting of a mounting bracket 200 and back plate 126 of a dispenser holder 100. Base plate 202 of mounting bracket 200 may be attached to a suitable substantially flat surface. Release tab 114 is positioned to slide within guiderails 164 of back plate 126. A spring 226 is received on a first end by post 170 of back plate 126 and on a second end by post 174 of release tab 114 (posts 170 and 174 not visible in FIG. 8). FIG. 8 also shows octagonal aperture 130 that forms a part of first attachment clip 192 on the back side of dispenser holder 100. Octagonal post base 212 and attachment post 214, and bore 222 are also shown in FIG. 8. Octagonal post base 212 of mounting bracket 200 is fit within octagonal aperture 130 when dispenser holder is attached to mounting bracket 200.

FIG. 8 also illustrates asymmetrical aperture 178 of release tab 114. Release tab 114 is slidably moveable along guiderails 164 to provide a releasable connection between a mounting apparatus, such as mounting bracket 200 shown in FIG. 8, and dispenser holder 100. FIG. 8 shows release tab 114 in the engaged position in which the narrow end of asymmetrical aperture 178 is held in place in the locked or engaged position underneath attachment post 214. Release tab 114 is held in place by a force provided by spring 226. When release tab 114 is depressed in the direction indicated by arrow 370, the wider side of aperture 178 is moved over attachment post 214, thus releasing the corresponding attachment clip 192 from attachment post 214, and permitting dispenser holder 100 to be detached from mounting bracket 200. The release tab 114 is similarly moveable to provide a releasable connection between dispenser holder 100 and any other type of mounting apparatus, such as mounting clamp 300.

Similarly, release tab 116 (see FIGS. 1 and 2) is moveable along guide rails 166 to provide a releasable connection between dispenser holder 100 and a mounting apparatus, such as a mounting bracket 200 or a mounting clamp 300.

FIG. 9 is a side cross-sectional view of a dispenser holder 100 releasably connected to a mounting bracket 200. Mounting plate 202 of mounting bracket 200 includes hexagonal post base 212, attachment post 214, and bore 222 extending through the center of hexagonal post base 212 and attachment post 214. Dispenser holder 100 includes projection 154 extending outwardly from the back surface 110 of sidewall 112 (not shown in FIG. 9). Dispenser holder 100 further includes back plate 126 having octagonal aperture 130, guiderails 164 and release tab 114.

As described above, attachment clips 192/194 are designed for auto-loading of dispenser holder 100 onto a mounting apparatus. Specifically in this example, when dispenser holder 100 is not connected with a mounting apparatus, release tab 114 is maintained in a locked position by a spring force, such as provided by spring 226 in FIG. 8. To load the dispenser holder onto a mounting apparatus, attachment clip 192 or 194 is positioned proximate an attachment post (such as attachment posts 210 or 310) of the mounting apparatus. The user may then push down on the dispenser holder in the direction indicated by arrow 213. Tapered tip 155 of alignment projection 154 cooperates with tapered inner sidewall 225 of bore 22 to guide alignment projection 154 into bore 222 and thus help to align aperture 130 over post base 212 and align post 214 so as to be substantially concentric on a tapered wall 115A on the locking side 173 (the narrow end in this example) of aperture 178.

The tapered wall indicated by reference numerals 115A and 115B around at least a portion of an inner perimeter of aperture 178 cooperates with top tapered edge 211 of cap 115 so as to cause release tab 114 to slide within guiderails 126 toward an unlocked position in which the first, unlocking side 171 (the wider end in this example) of aperture 130 is positioned over cap 215 of attachment post 210. The translational motion of the release tabs within guiderails 126 is substantially perpendicular to the mating force applied by the user and is provided by the chamfered interface of the two components (tapered wall 114 of aperture 178 and the tapered top edge 211 of cap 115).

The dispenser holder may be rotated by the user before pushing the dispenser holder onto the attachment post so as to align the shape of aperture 130 with the shape of post base 212 in a selected one of the one or more orientations defined by the shape of post base 212 and aperture 130.

The dispenser holder may then be further pushed in the direction indicated by arrow 213 until the locking surface 117 of release tab 114 is positioned below the locking surface 217 of cap 215. Release tab 114 is then biased by spring 226, causing release tab 114 to slide along guiderails 126 toward the locked position in which the second, locking (narrower) end of aperture 130 is positioned under cap 215, and locking surface 117 of release tab 114 engages the locking surface 217 of cap 215, as shown in FIG. 9, thus locking dispenser holder 100 to attachment post 210 of the mounting apparatus and preventing its removal therefrom.

During the auto-loading process, projections 154 and 144 may help to counteract the opposing translational force of the spring so as to smoothly guide post 214 to the locking surface 117 instead of being misguided to the opposing side of the spring and hung up on the side wall of aperture 130.

As shown in FIG. 9, when attachment clip 192 formed by projection 154 and hexagonal aperture 130 is positioned for releasable connection with attachment post 210 of mounting bracket 200, octagonal post base 212 is received within octagonal aperture 130, and projection 154 is received by bore 222. Tapered wall 115 of release tab 114 is positioned proximate shoulder 221 of post base 212. Base portion 147 of tapered projection 154 is positioned proximate the tapered sidewall 225 of bore 222. Locking surface 117 on the narrower end of aperture 178 of release tab 114 is positioned below the locking surface 217 of cap 215, thus locking dispenser holder to mounting plate 202. Depression of release tab 114 in the direction indicated by arrow 370 in FIG. 1 causes release tab 114 to slide along guiderails toward the unlocked position, in which the wider side of aperture 178 is positioned over attachment post 214. The wider end of aperture 178 is relatively wider than the widest diameter of cap 215 of attachment post 214, thus permitting dispenser holder to be removed from mounting bracket 200.

Figure 10:
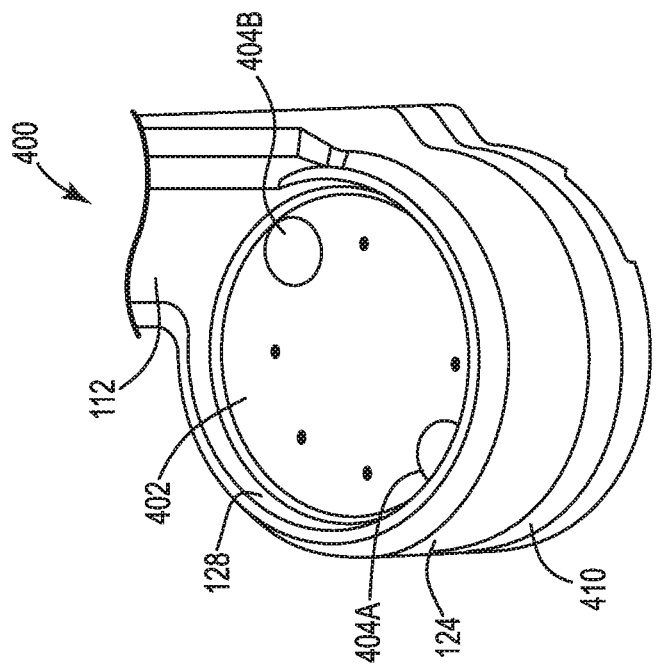
FIG. 10 is a perspective diagram of the lower portion of another example dispenser holder configured for electronic sensing of dispenser actuations.

FIG. 10 is a perspective diagram of the lower portion of another example dispenser holder 400 configured for electronic sensing of dispenser actuations. As with dispenser holder 100 of FIGS. 1 and 2, dispenser holder 400 includes base portion 124 and sidewall 112. Dispenser holder 400 further includes a base 402, one or more actuation sensors 404, and a sensor housing 410. Sensor housing 410 contains electronics that receive sensor signals from the one or more actuation sensor(s) 404 to detect actuation of a product dispenser installed in dispenser holder 400. In this example, there are two actuation sensors 404A and 404B. However, it shall be understood that there may be one or more actuation sensors, and that the disclosure is not limited in this respect.

A configuration such as that shown in FIG. 10 may be useful in hospital or restaurant settings where monitoring of hand hygiene practices is desired. For example, a hand hygiene product dispenser, such as a manual pump bottle, may be installed in dispenser holder 400. When the pump bottle is actuated by a user, the downward force applied to the manual pump actuator is transferred (at least in part) to the pump bottle. This downward force is sensed by the one or more actuation sensors 404A and/or 404B. Sensor circuitry housed within sensor housing 410 receives the sensed actuation signals from actuations sensors 404A and/or 404B, and may process the actuation signals in any of a number of ways. For example, sensor circuitry within sensor housing 410 may be configured to count the number of sensed dispenser actuations. Sensor circuitry 310 may include a counter that increments a count in response to each detected actuation of the product dispenser. As another example, the sensor circuitry may be configured to activate a visual indicator, such as an LED indicator, in response to each detected actuation of the product dispenser. As another example, the sensor circuitry may be configured to communicate each sensed dispenser actuation, or the counted number of dispenser actuations, to an external device.

Figure 11:
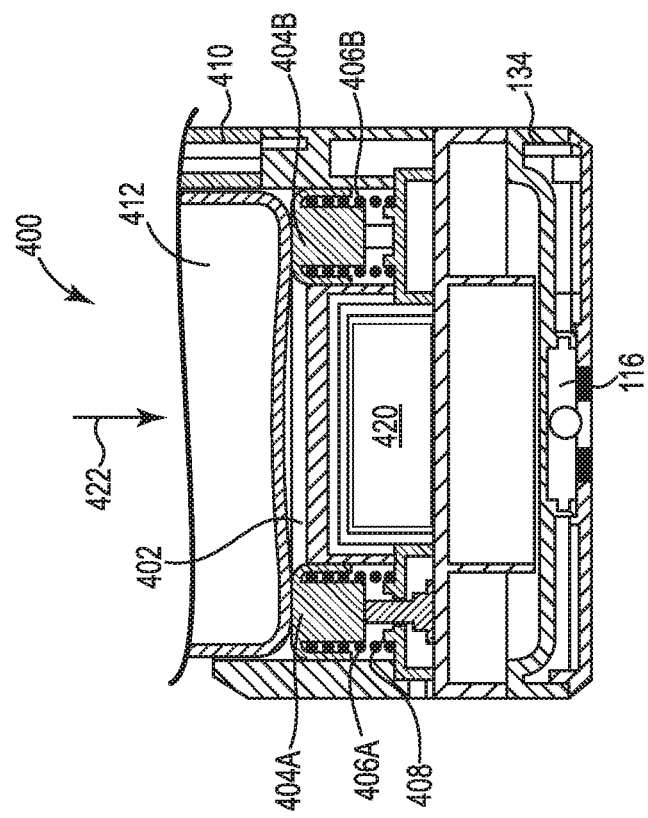
FIG. 11 is a cross-sectional side view of the example dispenser holder of FIG. 10.

FIG. 11 is a cross-sectional side view of the example dispenser holder 400 of FIG. 10. A manual pump bottle 412 is installed in dispenser holder 400 and is supported by base 402. In this example, actuation sensors 404A and 404B is configured as a push button switch. To that end, actuation sensors 404A and 404B further include springs 406A and 406B, respectively and electrical contact 408. Although two push buttons 404A and 404B are shown in the example of FIG. 11, it shall be understood that the dispenser holder may include a single push button/actuation sensor, or that the sensor may be implemented using a different type of actuation switch, and that the disclosure is not limited in this respect.

When the manual pump actuator is depressed to dispense a product from bottle 412, a downward force is applied to actuation sensors 404A and 404B in the direction indicated generally by arrow 422. Application of this force compresses the spring 406A and 406B, respectively, causing the movable contacts on the base of the push button to connect with the stationary contacts 408A and 408B. When the force is removed, such as when the user removes their hand from the pump bottle actuator, the springs 406A and 406B are decompressed and the switches return to the rest stage. Although in this example actuation sensors 404A and 404B are shown and described with respect to push button switch, it shall be understood that actuation sensors 404 could be configured using any other appropriate type of sensor or switch, and that the disclosure is not limited in this respect.

Figure 12:
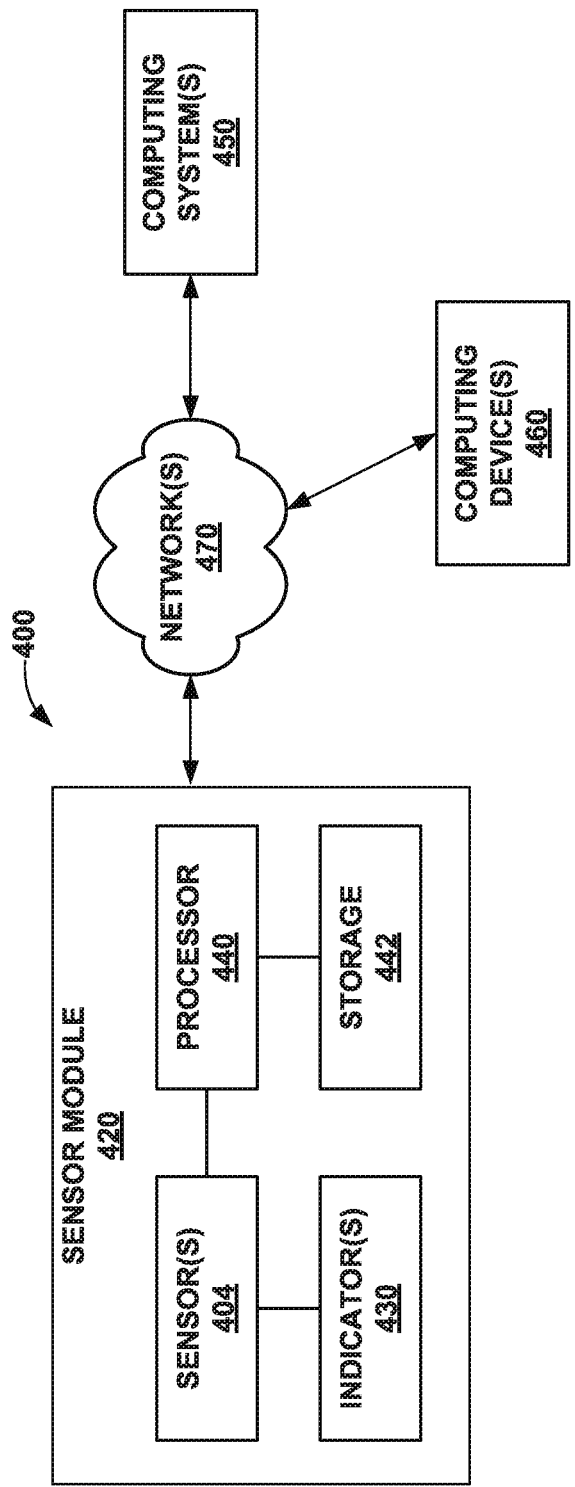
FIG. 12 is a block diagram of an example electronic sensor module and an environment in which the sensor module may be used to communicate data concerning product dispenser actuations.

Sensing circuitry 420 housed within sensor housing 410 receives the sensed actuation signals from actuation sensors 404A and/or 404B, and may process the actuation signals in any of a number of ways. FIG. 12 is a block diagram of an example electronic sensor module 420 and an environment in which sensor module 420 may be used to communicate data concerning product dispenser actuations. Sensor module 420 includes one or more sensors 404, one or indicators 430, processor(s) 440, and storage device(s) 442. Sensor module 420 may communicate with external computing devices 460 or a remote computing system 450 via one or more networks 470. Network(s) 470 may include, for example, one or more of a dial-up connection, a local area network (LAN), a wide area network (WAN), the internet, a cell phone network, satellite communication, Bluetooth, Near Field Communication (NFC), Wi-Fi, or other means of electronic communication. The communication may be wired or wireless.

Processor 440 of sensor module 420 may be configured to count the number of sensed dispenser actuations. In another example, sensor module may include a counter in addition to or instead of processor 440. As another example, the sensor module 420 may be configured to activate one or more indicators 430, such as an audible or visual indicator, each time a dispenser actuation is sensed. As another example, the sensor module 420 may be configured to communicate each sensed dispenser actuation, or the counted number of dispenser actuations, to an external device or system via networks 470. A log of the dispenser actuations may be stored in storage devices 442. Each dispenser actuation may be associated with a time stamp indication of the date and time of the associated dispenser actuation.

Computing systems 450 may include a local computer configured to receive dispenser actuation data from multiple sensor modules 420 associated with one or more dispenser holders 400 installed in different locations around a particular building or site. Computing systems 450 may also include a remote server computer configured to receive dispenser actuation data from multiple locations or sites. Computing device(s) 460 may include, for example, one or more base stations or other receiving devices configured to receive dispenser actuation data.

In one example, computing systems 450 and computing devices 460 may be part of a hand hygiene compliance system that monitors, analyzes, stores, and reports data related to hand hygiene compliance. In that example, computing devices 460 may include a plurality of compliance badges, each uniquely associated with an employee of a hospital or other healthcare facility. The compliance badge may receive sensor actuation data from a sensor module (such as sensor module 420) of a dispenser holder (such as dispenser holder 400) each time the user actuates a hand hygiene product dispenser installed in the dispenser holder. Example hand hygiene compliance systems with which the dispenser holder 400 and sensor module 420 may be used are described in U.S. Pat. Nos. 8,395,515 and 8,502,680, which are incorporated herein by reference in their entirety.

Figure 13A:
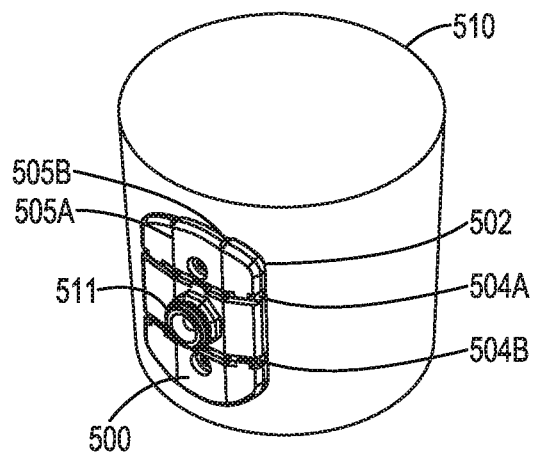
FIGS. 13A-13C show an example mounting bracket mounted to various support objects.
Figure 13B:
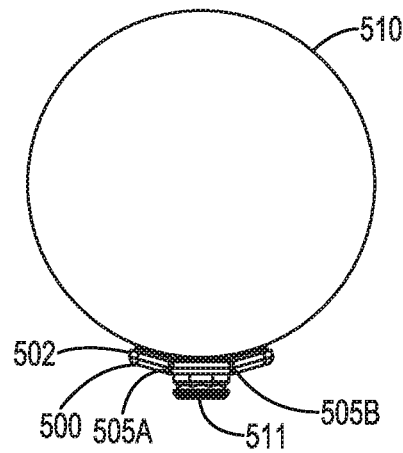
Figure 13C:
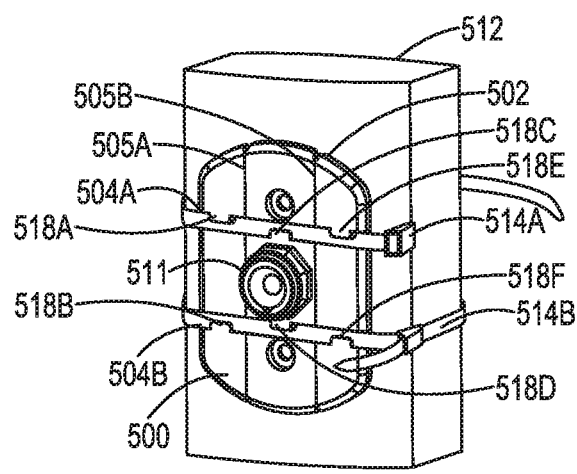

FIGS. 13A-13B are views showing an example mounting bracket 500 mounted to a pole 510 or other support object having a curved surface; FIG. 13C shows example mounting bracket 500 mounted to a support object 512 using cable ties 514A and 514B. Mounting bracket 500 includes a base plate 502 and an attachment post indicated generally by reference numeral 511. In this example, base plate 502 includes one or more screw holes for screw mounting the mounting bracket 500 to a support object, such as a wall, table, counter, cabinet, or other substantially flat surface. Base plate 502 also includes one or more channels 504A-504B by which mounting bracket 500 may be attached to a support object using one or more cable or zip ties 514A and 514B, straps or other type of mechanical fastener. Mounting bracket 500 may also be adhesively mounted to any suitable surface.

As shown in FIGS. 13A and 13B, base plate 502 may also include one or more hinges, such as hinges 505A and 505B, that permit mounting bracket 500 to conform to contoured surfaces, such as around corners or on rounded surfaces, such as that provided by support object 510. Hinges 505A and 505B may be, for example, a thin flexible hinge or flexible bearing made from the same material as the base plate 502. The hinge(s) may be a living hinge produced in an injection molding operation that creates the hinges 505A and 505B and the base plate 502 at one time and as a single piece. For example, base plate 502 may be thinned or cut along one or more of channels 504A and/or 504B to allow the rigid sections of base plate 502 to bend along the line of the hinge. For example, base plate 502 may be thinned or cut along one or more locations defining hinges 504A and/or 504B to allow the rigid sections of base plate 502 to bend along the line of the hinge(s) 504A and/or 504B, as shown in FIG. 13B. In another example, the hinge may be formed of some other flexible substance and attached to the pieces of the base plate 502 in the desired location to form a conformable mounting bracket 500.

In FIG. 13C, mounting bracket 500 is attached to support object 512 using one or more cable or zip ties 514A and 514B, straps or other type of mechanical fastener. If desired, mounting bracket 500 may first be attached to support object 512 using an adhesive backing, tape, or other type of adhesive. Cable ties 514A and 514B may be inserted into channels 504A and 504B, respectively. Base plate 502 may further include tabs 518A-518F that help to contain cable ties 514A and 514B within channels 504A and 504B. Each cable tie 514A and 514B may be wrapped around the support object 512, and the male end inserted into the female locking mechanism. The cable tie may then be pulled tight to secure mounting plate 500 to the support object 500. Excess cable tie end may be removed if desired.

FIGS. 14A-14D are various views showing another example mounting bracket 520. Mounting bracket 520 includes a base plate 522 and an attachment post indicated generally by reference numeral 521. In this example, base plate 522 includes one or more screw holes, such as screw hole 526, for screw mounting the mounting bracket 520 to a support object, such as a wall, table, counter, cabinet, or other suitable surface. Base plate 522 also includes one or more channels 524A-524D by which mounting bracket 520 may be attached to a support object using one or more cable or zip ties, straps or other type of mechanical fastener. In this example, mounting bracket 520 includes an adhesive backing 527 by which mounting bracket may be adhesively mounted to any suitable surface. A release liner 523 protects the adhesive backing until such time as the mounting bracket is to be installed.

In the example of FIGS. 14A-14D, the cap of attachment post 521 includes a substantially flat top surface 525, and does not include a bore such as bore 222 as shown with respect to attachment post 210 of FIG. 5, for example. In this example, the associated connector clips sized to receive attachment post 521 would not include an alignment projection. However, the remaining portions of the attachment post 521 and connector clip would physically connect in the same way as that shown with respect to FIG. 9, albeit without bore 222 and alignment projection 154. Post 521 also includes a base having a shape; in this example, the shape is an octagon, although it shall be understood that the shape may be any n-sided polygon, clover-leaf shape, etc. and that the disclosure is not limited in this respect.

Figure 14A:
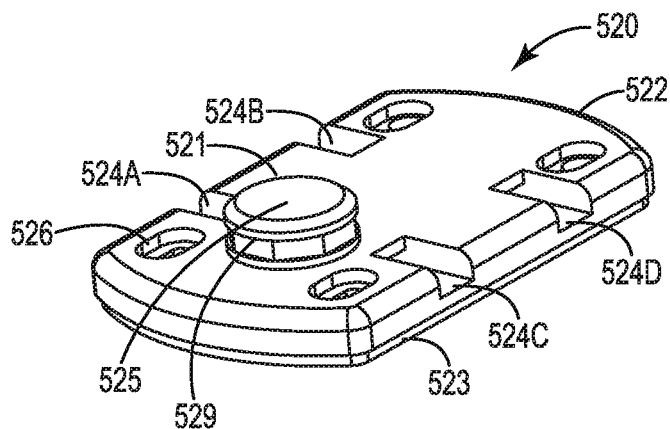
FIGS. 14A-14D are various views showing another example mounting bracket.
Figure 14B:
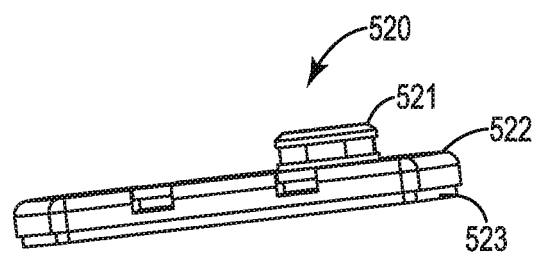
Figure 14C:
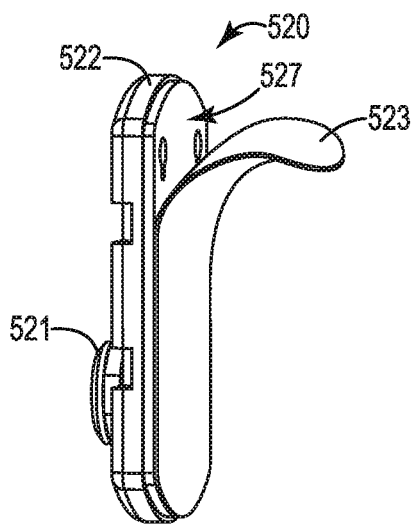
Figure 14D:
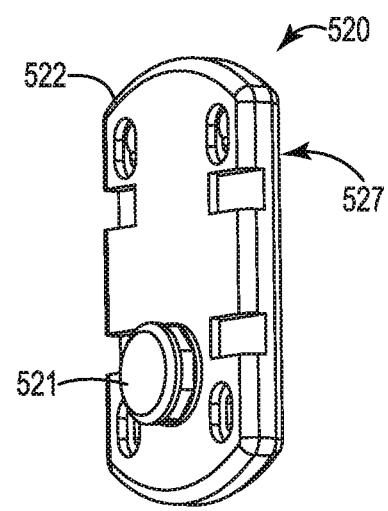
Figure 14E:
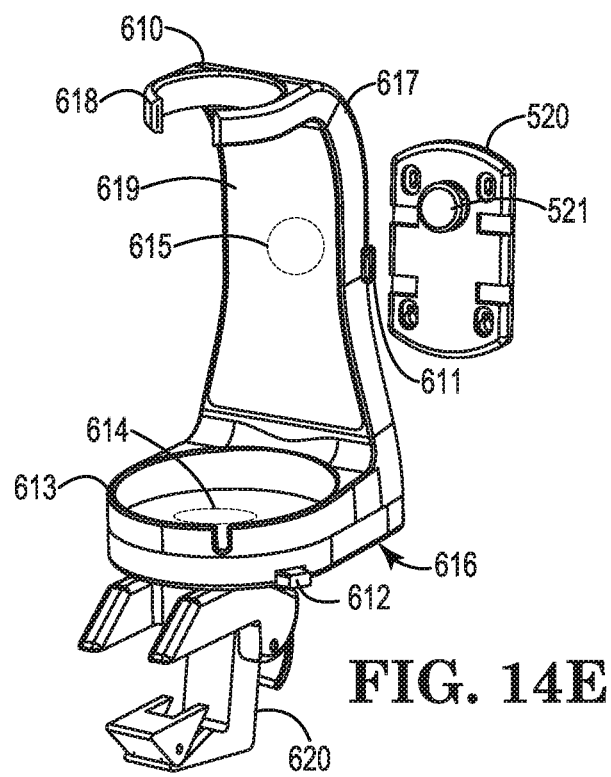
FIGS. 14E-14G show the mounting bracket of FIGS. 14A-14D and another example dispenser holder.
Figure 14F:
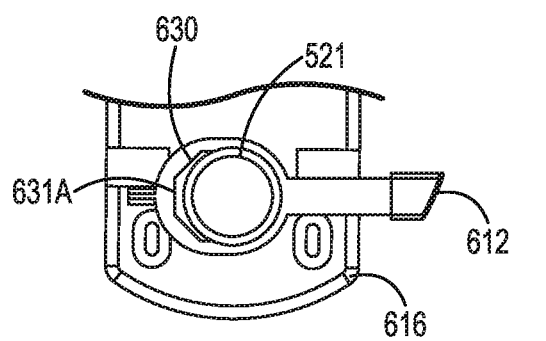
Figure 14G:
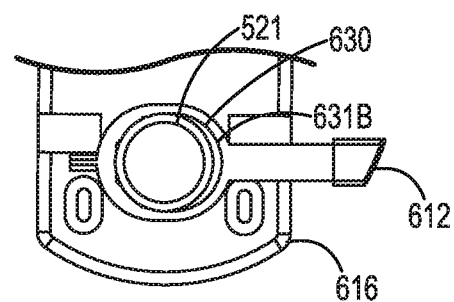

For example, FIGS. 14E-14G show the mounting bracket 540 of FIGS. 14A-14D and another example dispenser holder 610. Dispenser holder 610 includes a dispenser holder body 617 including a sidewall 619, a top portion 618, and a base 613. Top portion 618 forms first and second inwardly curving arms extending generally outward from sidewall 647 and forming a generally c-shaped receiving area sized to receive the neck or other suitable portion of a product dispenser. Base 613 is configured to support a product dispenser installed in dispenser holder 610. When properly installed into dispenser holder 610, a product dispenser, such as a manual pump bottle, is held in position by the first and second arms of top portion 618, sidewall 619, and base 613. Base 613, sidewall 619 and top portion 618 may be sized and/or shaped so as to fit one or more different sizes or shapes of product dispensers, or multiple interchangeable bases or top portions may be provided, each configured to hold a differently sized or shaped product dispenser.

The back side of dispenser holder body 617 includes an aperture 615 (shown in shadow in FIG. 14E). Base 649 similarly includes a mounting aperture 614 (also shown in shadow in FIG. 14E). Apertures 614 and 615 are sized to receive attachment post 521 as shown in FIGS. 14F (latch 612 in the open position) and 14G (latch 612 in the locked position).

In this example, apertures 615 and/or 614 need not be of the same or complementary geometry to the base of attachment post 521. Rather, a first locking side 631A of aperture 630 of latch 612 includes shaped sidewalls having the same or complementary geometry to the shape of the base of attachment post 521. In this example, the first locking side 631A of aperture 630 matches the octagon shape of the base 529 of attachment post 521 and is sized such that the first locking side 631A engages the bottom surface of the cap when the latch 612 is in the first locked position (FIG. 14F). The second unlocking side 631B of aperture 630 is relatively wider than the diameter of the cap of the attachment post 521, and permits the dispenser holder 610 to be removed from the mounting bracket when the latch 612 is in the second unlocked position (FIG. 14G). In this example, the geometry of second unlocked side 631B of aperture 630 does not match the geometry of base 529, however, the second unlocked sides 631B could be any shape that allows the attachment post to be inserted and removed into aperture 6310 when the latch 612 is in the second unlocked position, and the disclosure is not limited in this respect.

To mount the dispenser holder 610 to a support object, one of apertures 614 or 615 (614 in this example) is aligned with mounting post 521 of mounting bracket 520. One of release levers 611 or 612 (612 in this example) is depressed to slide release latch to the open position, as shown in FIG. 14F, allowing the relatively larger, unlocking side 631A of aperture 630 to receive mounting post 521. Lever 612 is then released as shown in FIG. 15G, allowing the relatively narrower, and shaped locking side of aperture 630 to engage the complementary-shaped base 523 of the mounting post 521, thus securing the dispenser holder 640 to the mounting bracket 540.

FIGS. 15A-15E show another example of a mounting bracket 540. Mounting bracket 540 includes a base plate 542. In this example, mounting bracket 540 does not include an attachment post. Base plate 542 includes one or more screw holes, such as screw hole 546, for screw mounting the mounting bracket 520 to a support object, such as a wall, table, counter, cabinet, or other suitable surface. Base plate 542 also includes one or more channels 544A-544D by which mounting bracket 540 may be attached to a support object using one or more cable or zip ties, straps or other type of mechanical fastener. In this example, mounting bracket 540 includes a hook and loop fastener by which mounting bracket 540 may be mounted to any suitable surface. A first side 543 of the hook and loop fastener may be attached (such as by an adhesive) to the back side of mounting plate 542, while a second side 546 of the hook and loop fastener may be attached (such as by an adhesive, cable ties, and/or other attachment mechanism) to the support object. To attach the mounting bracket 540 to the support object, the first and second sides 543 and 546 are pressed together such that the two sides fasten or bind together. The two sides may be separated by pulling or peeling the two surfaces apart.

FIGS. 15F-15I show the mounting bracket 540 of FIGS. 15A-15E and another example dispenser holder 640. Dispenser holder 640 includes a dispenser holder body 648 including a sidewall 647, a top portion 644, and a base 649. A top portion 644 forms an inwardly curved arm extending generally outward from sidewall 647. The curved arm of top portion 644 is sized to receive the neck or other suitable portion of a product dispenser. Base 649 is configured to support a product dispenser installed in dispenser holder 640. When properly installed into dispenser holder 640, a product dispenser, such as a manual pump bottle, is held in position by the inwardly curved top portion 644, sidewall 644, and base 649. Base 118, sidewall 644 and top portion 644 may be sized and/or shaped so as to fit one or more different sizes or shapes of product dispensers, or multiple interchangeable bases or top portions may be provided, each configured to hold a differently sized or shaped product dispenser.

Sidewall 647 includes a mounting slot 642. Base 649 similarly includes a mounting slot 652. Mounting slot 642 is sized to receive a rod of a quick release-type cam 644 as shown in FIGS. 15G-15I. To mount the dispenser holder 640 to a support object, mounting slot 642 (or mounting slot 645, as applicable) is aligned with one of mounting holes 545A or 545B of mounting bracket 540. The rod of cam 644 is inserted into the desired slot 642/645 and then into the selected mounting hole (545A in this example), as shown in FIG. 15H. The cam lever is then closed as shown in FIG. 15I to tighten the cam and secure the dispenser holder 640 to the mounting bracket 540.

Figure 16A:
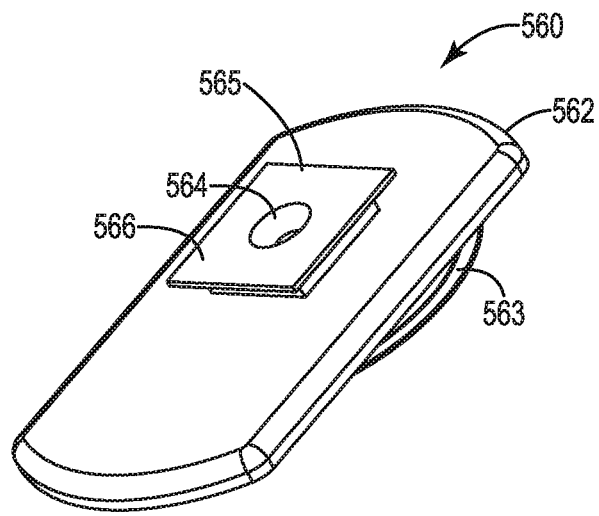
FIGS. 16A-16C show another example of a mounting bracket.
Figure 16B:
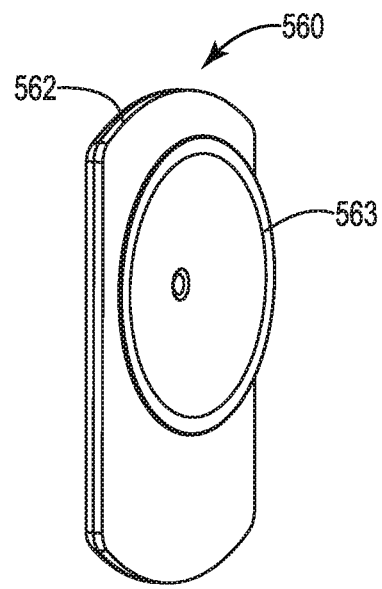
Figure 16C:
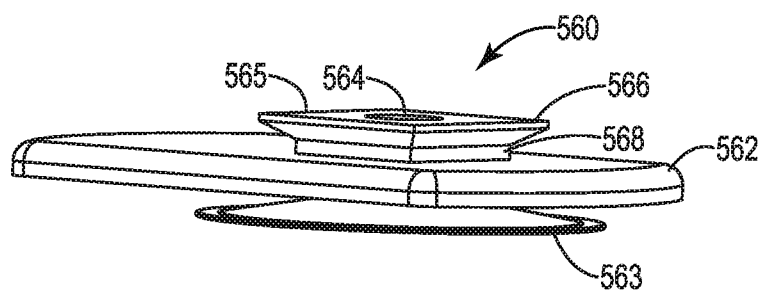

FIGS. 16A-16C show another example of a mounting bracket 560. Mounting bracket 560 includes a base plate 562. In this example, a first side of mounting bracket 560 includes a substantially rectangular- or square-shaped attachment post 565. A second side of base plate 562 further includes a suction cup 563 for mounting the mounting bracket 560 to a support object, such as a wall, table, counter, cabinet, or other suitable surface. To attach the mounting bracket 560 to the support object, suction cup 563 is depressed against a surface provided by the support object such that the mounting bracket is secured to the support surface.

Figure 16F:
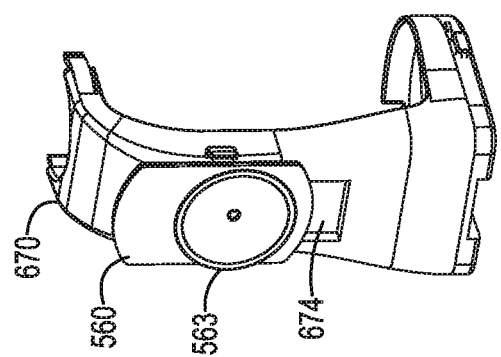
FIGS. 16D-16F show the mounting bracket of FIGS. 16A-16C and another example dispenser holder.
Figure 16E:
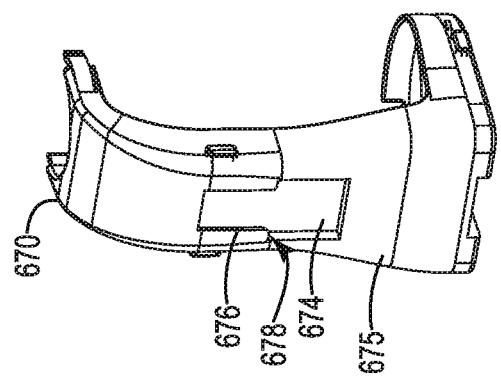
Figure 16D:
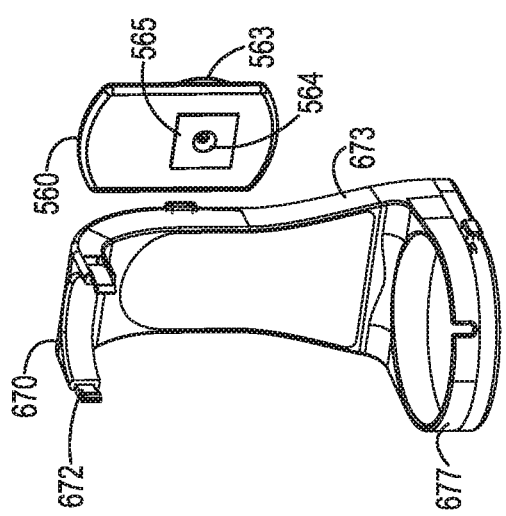

FIGS. 16D-16F show the mounting bracket 560 of FIGS. 16A-16C and another example dispenser holder 670. Dispenser holder 670 includes a dispenser holder body 673 including a sidewall 675, a top portion 672, and a base 677. Top portion 672 includes a retractable arm (see FIGS. 18A-18C) sized to receive the neck or other suitable portion of a product dispenser. Base 677 is configured to support a product dispenser installed in dispenser holder 670. When properly installed into dispenser holder 670, a product dispenser, such as a manual pump bottle, is held in position by the retractable arm, sidewall 675, and base 677. Base 677, sidewall 675 and top portion 672 may be sized and/or shaped so as to fit one or more different sizes or shapes of product dispensers, or multiple interchangeable bases or top portions may be provided, each configured to hold a differently sized or shaped product dispenser.

A back side of sidewall 674 includes a mounting track 676 and concave receiving area sized to receive post 565 of mounting bracket 560, as shown in FIG. 16E. Base 677 may similarly include a mounting track (not shown). To mount the dispenser holder 670 to a support object, mounting post 565 is aligned with the concave receiving area 674 of mounting track 676. The mounting post 565 includes a substantially flat rectangular- or square-shaped top portion 566 and tapers down to a post portion 568 having a relatively smaller width than the top portion 566, as shown in FIG. 16C. The mounting track 676 is sized to slidably receive and retain the mounting post 565 within rails 678. The substantially flat top portion 566 slides into the open end of mounting track rails 678 until the mounting post 565 is fitted within the mounting track 676 as shown in FIG. 16F, thus securing the dispenser holder 640 to the mounting bracket 540.

Figure 17C:
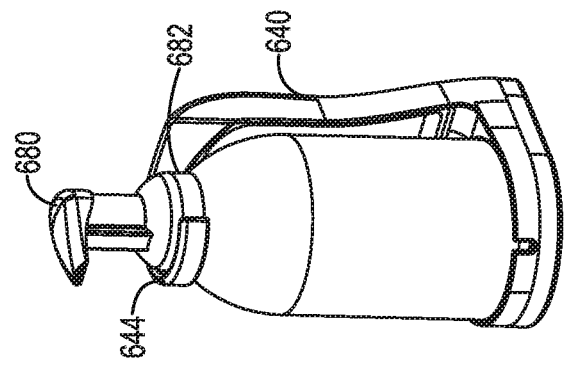
FIGS. 17A-17C show an example product dispenser being loaded into an example dispenser holder.
Figure 17B:
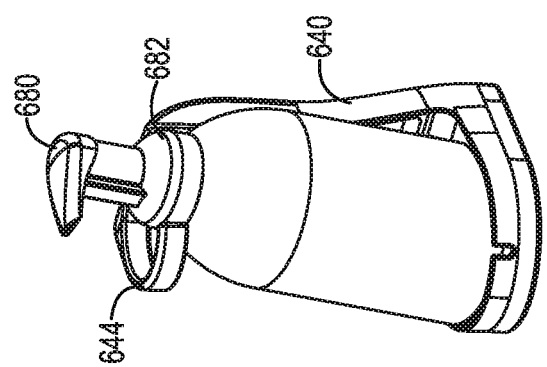
Figure 17A:
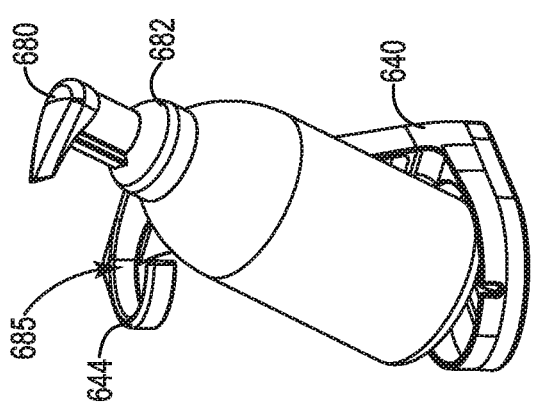

FIGS. 17A-17C show an example product dispenser 680 (a manual pump bottle in this example) being loaded into example dispenser holder 640. As described above, top portion 644 forms a single inwardly curved arm forming a receiving area 685 sized to receive a neck 682 or other suitable portion of a product dispenser.

Figure 18C:
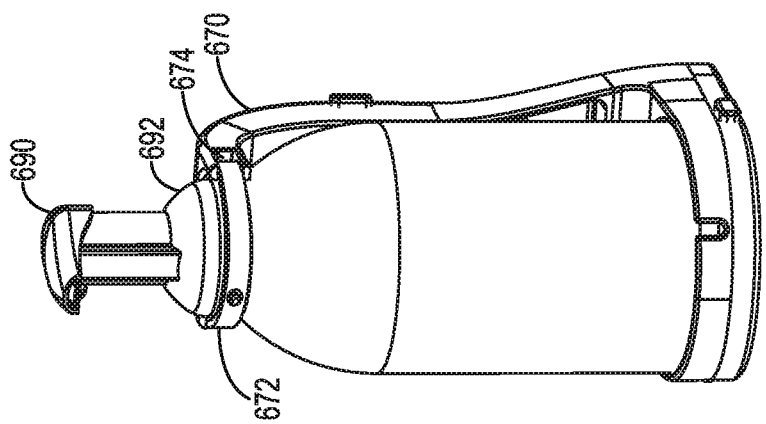
FIGS. 18A-18C show an example product dispenser being loaded into another example dispenser holder.
Figure 18B:
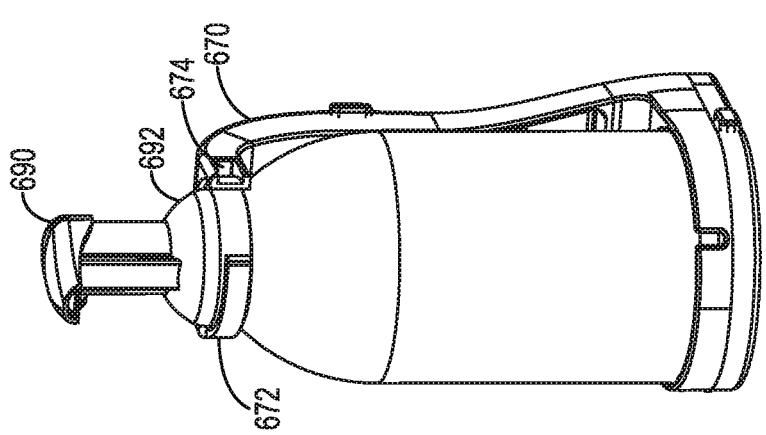
Figure 18A:
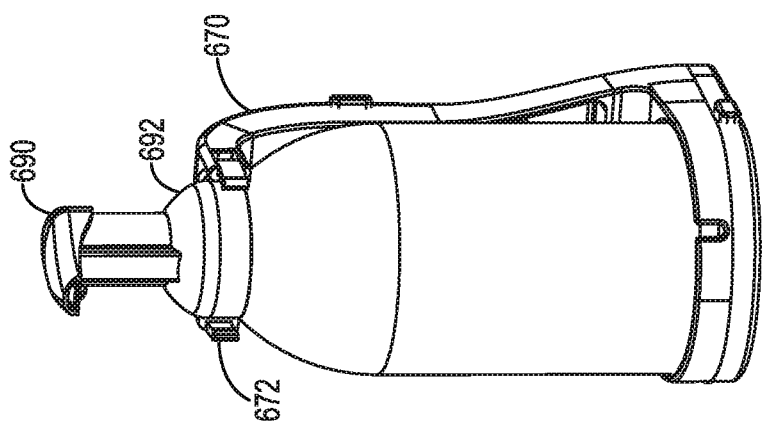

FIGS. 18A-18C show an example product dispenser 690 (a manual pump bottle in this example) being loaded into example dispenser holder 670. As described above, top portion of dispenser holder 670 includes a retractable arm 672. Once the product dispenser 690 is placed into dispenser holder 670, retractable arm 672 may be pulled out, as shown in FIG. 18B, and wrapped around neck 692 (or other suitable portion) of product dispenser 690 and connected into locking mechanism 674, as shown in FIG. 18C.

Figure 19:
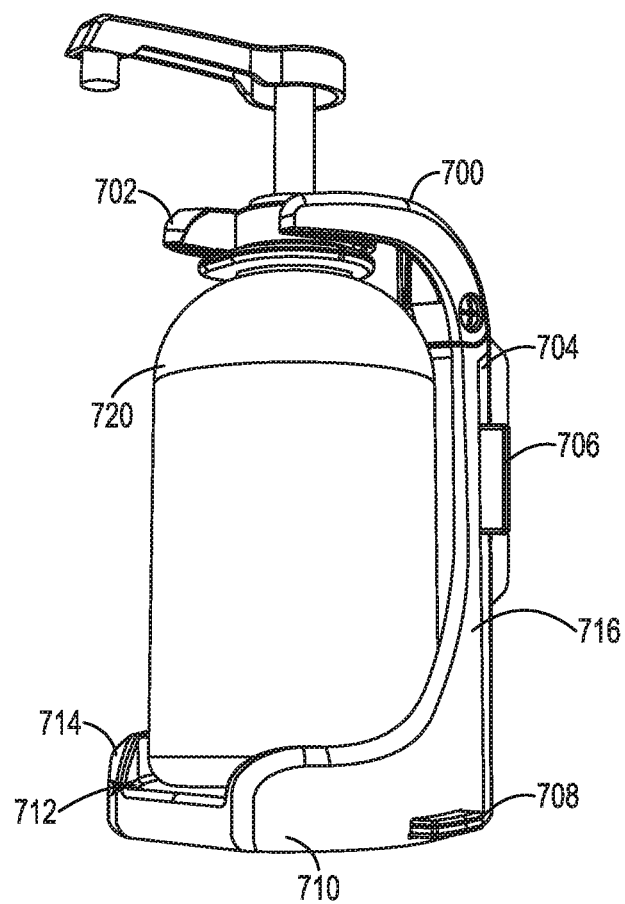
FIG. 19 shows another example product holder.

FIG. 19 shows another example product holder 700. Product holder 700 includes product holder body 716 including a top portion 702, one or more sidewalls 704 and a base portion 710, and is generally shaped to hold a product dispenser 720. As with the examples described above, product holder body may be various sized and/or shaped to hold any size and shape of product dispenser, including manual pump bottles, touch free pump bottles, containers for sanitizing/cleansing wipes, spray bottles, etc., and the disclosure is not limited in this respect. Example product holder 700 includes clips on the back and bottom portions of product holder 700; however, the clips may be located at either or both of these locations, or at any other appropriate location, depending on the size and shape of the product holder body. Release latches 706 and 708 serve to release the product holder from a mounting bracket (not shown) when product holder is mounting from the backside clip or the bottom side clip, respectively. Base portion 710 is sized to support product dispenser 720 further includes a rim 714 having a cut-out section 712. Rim 714 of base portion 710 serves to hold product dispenser within the product holder body 716. Cut-out section 712 may help to provide ease of clean-up of the product holder, as it may permit easier access to the base plate, the inside of rim 714 and the interior sidewalls of the product holder body 716.

FIGS. 20A and 20B show another example product holder 750. Product holder 750 includes a product holder body including a hook portion 755 and a side portion 758. Product holder 750 is designed to provide a hangar, hook, loop, catch, clasp, clip, latch, fastener or other supporting mechanism by which a product dispenser may be suspended from or fastened onto without being supported by a base. In the examples of FIGS. 20A and 20B, a hangar 756 provides a generally ring-shaped receiving area 754. Hangar 756 may include a hinge and closure mechanism by which hangar 756 may be opened and closed to allow installation and removal of, for example, a manual spray bottle. In other examples, hangar 756 need not provide an entirely closed receiving area (such as shown in FIG. 15F, for example) or may be rotated 90 degrees to provide a generally curved or angular shape hook from which a product dispenser may be held or suspended. FIG. 20B shows a back perspective view of example product holder 750, showing an example placement of a connector clip 770 on the back side 760 of product holder 750. A release latch 764 allows product holder 750 to be released from a corresponding mounting bracket.

FIG. 20C shows another example product holder 780. In this example, product holder 780 includes arms 782A and 782B (only arm 782A is visible in FIG. 20C) extending outwardly from the product holder body. A hinged arm 748 rotates on a hinge 782 to allow the product dispenser 786 to be received into the product holder body. Once the product dispenser 786 is loaded into the product holder 780, arm 748 is lowered, thus suspending product dispenser 786 from the arms 782A, 782B, and 748. Such a product holder 780 may also be used with other types of product dispensers, such as trigger sprayer bottles, or any other type of product dispenser.

Figure 21A:
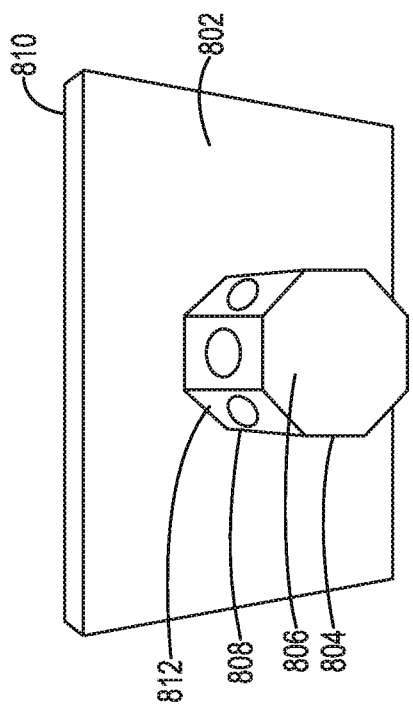
FIGS. 21A and 21B show another example mounting apparatus and latch.
Figure 21B:
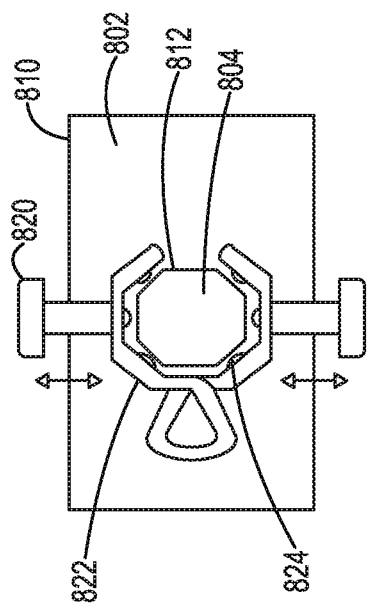

FIGS. 21A and 21B show another example mounting apparatus 810 and an example latch 820. Mounting apparatus 810 includes a back plate 802 and an attachment post 804. Attachment post 804 has a multi-faceted cross section and includes a plurality of faces 812, each face including a dimple 808. Latch 820 includes an engagement member 822 including a plurality of detents 824 corresponding to the number of faces 812 on the attachment post 804. Detents 824 are configured to engage with dimples 808 to secure a product holder to mounting apparatus 810. The multifaceted attachment post 804 and latch 820 thus provide a plurality of incremental stops, thus permitting attachment of a dispenser holder to mounting apparatus 810 in multiple orientations.

Figure 22:
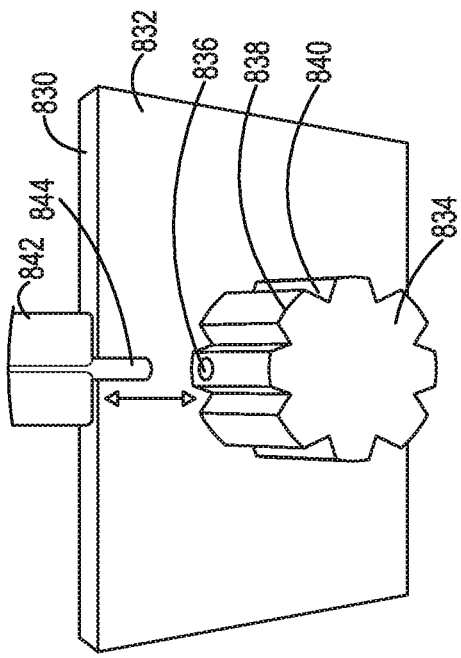
FIG. 22 shows another example mounting apparatus and latch.

FIG. 22 shows another example mounting apparatus 830 and an example latch 842. Mounting apparatus 830 includes a back plate 832 and an attachment post 834. Attachment post 834 has a generally circular cross-section including a plurality of notches 840 around the periphery of the cross-section, and a corresponding plurality of faces 838 around the periphery of the cross-section. Each face includes an aperture 836. A key-shaped latch 842 includes a post 844 sized to fit within apertures 836. A corresponding product holder would include an mounting aperture having a shape that is complementary to attachment post 834. Once the product holder is mounting in the desired orientation onto attachment post 834, post 844 of key 842 may be inserted into aperture 836 to secure product holder to the mounting apparatus 830. The multifaceted attachment post 834, latch 820 and complementary mounting aperture on a product holder thus provide a plurality of incremental stops, thus permitting attachment of a dispenser holder to mounting apparatus 830 in multiple orientations.

Figure 23A:
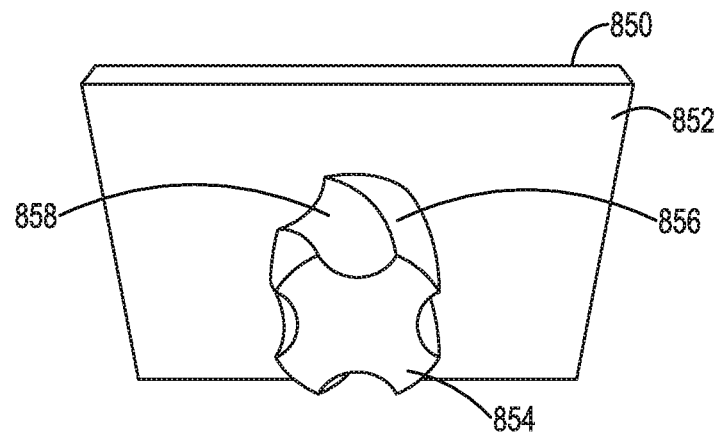
FIGS. 23A and 23B show another example mounting apparatus and latch.
Figure 23B:
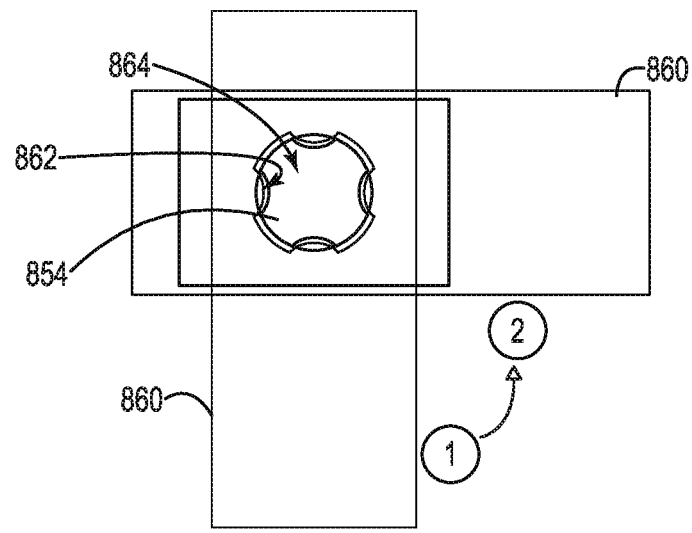

FIGS. 23A and 23B show another example mounting apparatus 850 and example latch 860. Mounting apparatus 850 includes a back plate 852 and an attachment post 854. In this example, attachment post 854 is a quarter-turn threaded fastener defined by grooves 858 and ridges 856. Latch 860 includes an aperture 864 having an inside wall 862 configured to fit within the grooves 858. FIG. 23B shows latch 860 in a first unlocked orientation (1) and a second locked orientation (2). Threaded attachment post 854 cooperates with the inside wall 862 of latch 860, thus permitting latch 860 to be turned 90 degrees from the first unlocked position (1) to the second locked position (2)

Figure 24B:
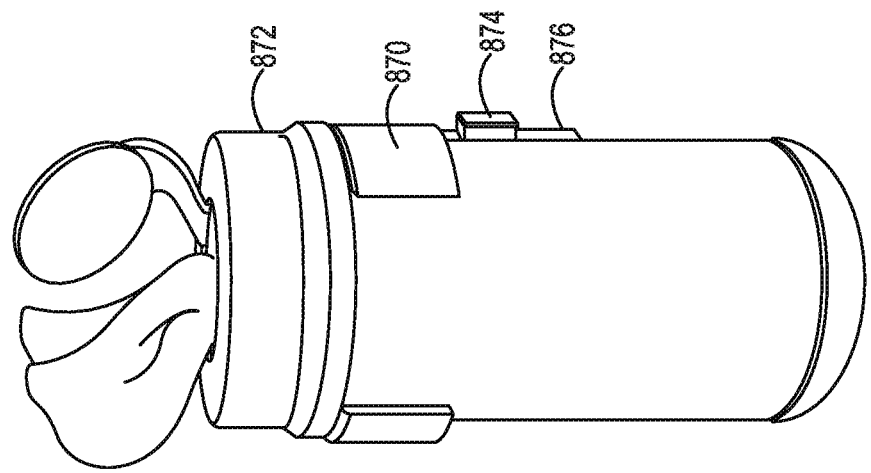
FIGS. 24A and 24B show another example product holder.
Figure 24A:
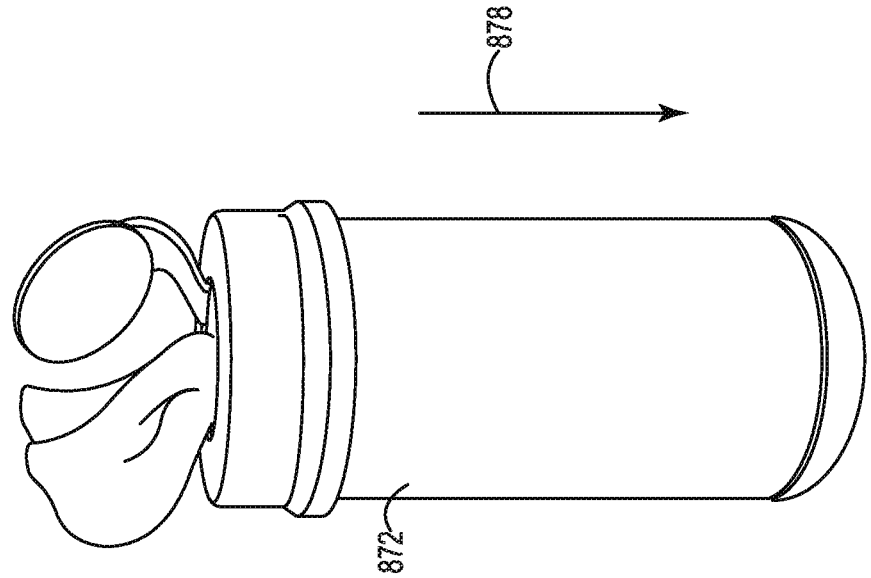

FIGS. 24A and 24B show another example product holder 870. Product holder 870 is configured to receive a cylindrical product dispenser. In this example, the product dispenser is a canister of cleansing or sanitizing wipes 872. To that end, product holder 870 includes arms 870 and a sidewall 876 that define a product dispenser receiving area. Sidewall 876 includes a mounting clip configured to connect with a mounting apparatus, such as any of the mounting apparatus shown and described herein. An example latch 874 may be seen in FIG. 24B. To install product dispenser 872 into product holder 870, the product dispenser 872 may be inserted into the receiving area between the arms of product holder 870 and moved down in direction of arrow 878 until product dispenser 872 is adequately supported by product holder 870.

FIGS. 25A and 25B show another example product holder 890. Product holder 890 is configured to receive a cylindrical product dispenser. In this example, the product dispenser is a canister of cleansing or sanitizing wipes 896. To that end, product holder 890 includes a retaining arm and a sidewall that define a product dispenser receiving area. Sidewall includes a mounting clip 894 configured to connect with a mounting apparatus, such as any of the mounting apparatus shown and described herein. An example latch 892 may be seen in FIG. 25A. To install product dispenser 896 into product holder 890, the product dispenser 896 may be inserted into the receiving area between the arms of product holder 890 and moved down in direction of arrow 897 until product dispenser 896 is adequately supported by product holder 890.

Example 1

A product dispenser mounting system comprising a dispenser holder, the dispenser holder including a dispenser holder body configured to receive a product dispenser, the dispenser holder body further including a sidewall having a front surface and a back surface and a back plate positioned proximate the back surface of the sidewall, the back plate further including a first aperture, and a latch positioned between the back plate and the back surface of the sidewall, the latch including a second aperture, the walls of the second aperture defining a locking side and an unlocking side, the latch further moveable between a first locked position and a second unlocked position, and a mounting apparatus configured for fixedly mounting on a support object, the mounting apparatus including an attachment post including a base portion having a shape configured to fit within the first aperture of the back plate in one or more orientations, and a post portion extending outwardly from the base portion and including a cap, the cap having a diameter that is relatively larger than a diameter of the post portion, the cap further providing a bottom locking surface, such that when the base portion of the attachment post is fit within the first aperture of the back plate, the walls of the second aperture defining the locking side engage the bottom locking surface of the cap when the latch is moved into the first locked position.

Example 2

The product dispenser mounting system of example 1, wherein the back plate further includes one or more guiderails configured to receive the latch such that the latch is slidably moveable within the guiderails between the first locked position and the second unlocked position.

Example 3

The product dispenser mounting system of any of examples 1 and 2, further including a projection extending outwardly from the back surface of the sidewall and aligned substantially in the center of the first aperture.

Example 4

The product dispenser mounting system of any of examples 1-3, wherein the post portion of the attachment post further include a bore extending longitudinally therethrough sized to receive the projection extending outwardly from the back surface of the sidewall.

Example 5

The product dispenser mounting system of any of examples 1-4, the latch further including a tapered wall around a perimeter of the second aperture on a side facing the back surface of the sidewall, and the cap of the post portion further having a top tapered edge configured to cooperate with the tapered wall around the perimeter of the second aperture to cause the latch to move from the first locked position to the second unlocked position.

Example 6

The product dispenser mounting system of any of examples 1-5, the dispenser holder body further including a top portion having first and second arms configured to receive the neck of the product dispenser.

Example 7

The product dispenser mounting system of claim 6 wherein the top portion is pivotally connected to the sidewall such that the first and second arms are moveable between a first, lowered position and a second, raised position.

Example 8

The product dispenser mounting system of any of examples 1-7 wherein the product dispenser is held in place in the dispenser holder when the first and second arms are in the first, lowered position and wherein the product dispenser may be removed from the dispenser holder when the first and second arms are in the second, raised position.

Example 9

The product dispenser mounting system of any of examples 1-8, the base portion of the attachment post having a size and a shape configured to fit within the first aperture in one or more orientations such that dispenser holder is maintained in a selected one of the one or more orientations when the dispenser holder is connected to the attachment post.

Example 10

The product dispenser mounting system of any of examples 1-9 wherein the base portion of the attachment post and the first aperture both have a shape comprising a regular n-sided polygon such that dispenser holder is maintained in a selected one of the one or more orientations when the dispenser holder is connected to the attachment post.

Example 11

The product dispenser mounting system of any of examples 1-10 wherein the base portion of the attachment post and the first aperture have a shape including one of a triangle, a square, a pentagon, a hexagon, an octagon, a star-shape, and a clover-shape.

Example 12

The product dispenser mounting system of any of examples 1-11, the back plate further including one or more guiderails configured to slidably receive the latch, the second aperture of the latch further including a first wider end having a diameter that is relatively wider than a diameter of the cap and a second narrower end having a diameter that is relatively narrower than the diameter of the cap, and wherein the latch is slidably moveable along the guiderails to move the second narrower end of the second aperture with respect to the attachment post such that the locking side of the release latch engages the bottom locking surface of the cap.

Example 13

The product dispenser mounting system of any of examples 1-12 wherein the release latch is further slidably moveable along the guiderails to move the first wider end of the second aperture with respect to the attachment post such that the dispenser holder may be removed from the mounting apparatus.

Example 14

The product dispenser mounting system of any of examples 1-13 wherein the mounting apparatus comprises a mounting bracket.

Example 15

The product dispenser mounting system of any of examples 1-14 wherein the mounting bracket includes a mounting plate having one or more screw holes by which the mounting bracket may be fixedly attached to the support object.

Example 16

The product dispenser mounting system of any of examples 1-15 wherein the mounting bracket includes one or more channels, each of the one or more channels configured to receive a fastener by which the mounting bracket may be fixedly attached to the support object.

Example 17

The product dispenser mounting apparatus of any of examples 4-16 wherein the fastener includes a cable tie.

Example 18

The product dispenser mounting system of any of examples 1-17 wherein the mounting bracket includes one or more living hinges by which the mounting bracket may conform to a contoured surface of the support object.

Example 19

The product dispenser mounting system of any of examples 1-18 wherein the mounting apparatus comprises a mounting clamp.

Example 20

The product dispenser mounting system of any of examples 1-19 wherein the mounting clamp further includes a first jaw providing a first inward clamping surface, and a second jaw having a proximal end pivotally attached to a proximal end of the first jaw, the second jaw providing a second inward clamping surface, wherein the attachment post extends outwardly from a top surface of the first jaw, and wherein the first jaw and the second jaw are movable with respect to each other to apply a clamping force to the support object.

Example 21

The product dispenser mounting system of any of examples 1-20 wherein the mounting clamp further includes an adjustment knob configured to adjust a distance between the first inward camping surface, the second inward clamping surface.

Example 22

The product dispenser mounting system of any of examples 1-21 wherein the mounting clamp further includes a tip portion pivotally attached to a distal end of the second jaw, the tip portion providing a third inward clamping surface.

Example 23

The product dispenser mounting system of any of examples 1-22 wherein the support object includes one of a wall, a cabinet, a pole, a post, a counter, a table, a shelf, and a cart.

Example 24

The product dispenser mounting system of any of examples 1-23 wherein the product dispenser is a manual pump bottle.

Example 25

The mounting system of any of examples 1-24 further comprising a sensor that detects actuation of the product dispenser, and an indicator that is activated in response to each detected actuation of the product dispenser.

Example 26

The mounting system of any of examples 1-25 further comprising a sensor that detects actuation of the product dispenser, and a counter that increments a count in response to each detected actuation of the product dispenser.

Example 27

The mounting system of any of examples 1-26 wherein data associated with the detected actuations of the product dispenser is received and analyzed by a hand hygiene compliance computing system.

Example 28

A product dispenser mounting system comprising a dispenser holder configured to support a product dispenser, the dispenser holder having a back side and a bottom side, one or more connector clips, each of the one or more connector clips integrated into one of the back side or the bottom side of the dispenser holder, each connector clip including a first sidewall including a first aperture, a release latch including a second aperture, the release latch moveable from a first unlocked position to a second locked position with respect to the first aperture, the release latch further providing a locking surface on a side facing the first sidewall, a mounting apparatus configured for fixedly mounting on a support object and including an attachment post configured for releasable connection to the one or more connector clips, the attachment post including a base portion having a shape configured to fit within the first aperture of the first sidewall in one or more orientations, and a post portion including a cap providing a bottom locking surface that engages with the locking surface of the release latch when the base portion of the mounting apparatus is fit within the first aperture and the release latch is in the second locked position.

Example 29

The product dispenser mounting system of example 28 wherein the one or more connector clips comprises a first connector clip integrated in the back side of the dispenser holder and a second connector clip integrated in the bottom side of the dispenser holder.

Example 30

The product dispenser mounting system of any of examples 28-29 further comprising a sensor that detects actuation of the product dispenser, and an indicator that is activated in response to each detected actuation of the product dispenser.

Example 31

The product dispenser mounting system of any of examples 28-40 further comprising a sensor that detects actuation of the product dispenser, and a counter that increments a count in response to each detected actuation of the product dispenser.

Example 32

The product dispenser mounting system of any of examples 28-31 wherein data associated with the detected actuations of the product dispenser is received and analyzed by a hand hygiene compliance computing system.

Example 33

The product dispenser mounting system of any of examples 28-32 wherein the support object includes one of a wall, a cabinet, a pole, a post, a counter, a table, a shelf, and a cart.

Example 34

The product dispenser mounting system of any of examples 28-33 wherein the product dispenser is a manual pump bottle.

Various examples have been described. These and other examples are within the scope of the following claims.

The invention claimed is:

1. A product dispenser mounting system comprising:
a dispenser holder body configured to support a product dispenser, the dispenser holder body including a top portion having first and second arms configured to receive a neck of the product dispenser, wherein the top portion is pivotally connected to a sidewall of the dispenser holder body such that the first and second arms are moveable between a first, lowered position and a second, raised position; and
a mounting apparatus configured to fixedly mount on a support object and to removably connect to the dispenser holder body in multiple orientations such that the dispenser holder body is maintained in a selected one of the multiple orientations when the dispenser holder body is loaded onto an attachment post of the mounting apparatus, wherein the dispenser holder body is configured to rotate relative to the attachment post of the mounting apparatus to orient the dispenser holder body in the selected one of the multiple orientations.

2. The product dispenser mounting system of claim 1, wherein the dispenser holder body further includes a base having at least one actuation sensor that detects actuations of the product dispenser.

3. The product dispenser mounting system of claim 2, further comprising a counter that increments a count in response to each of the detected actuations of the product dispenser.

4. The product dispenser mounting system of claim 2, wherein data associated with the detected actuations of the product dispenser is received and analyzed by a computing device.

5. The product dispenser mounting system of claim 1 wherein the product dispenser is held in place in the dispenser holder body when the first and second arms are in the first, lowered position and wherein the product dispenser may be removed from the dispenser holder body when the first and second arms are in the second, raised position.

6. The product dispenser mounting system of claim 1, the mounting apparatus including the attachment post having a size and a shape configured to removably connect with the dispenser holder body in the multiple orientations such that the dispenser holder body is maintained in the selected one of the one or more orientations when the dispenser holder body is loaded onto the attachment post.

7. The product dispenser mounting system of claim 1 wherein the support object includes one of a wall, a cabinet, a pole, a post, a counter, a table, a shelf, and a cart.

8. The product dispenser mounting system of claim 1 wherein the product dispenser is a manual pump bottle.

9. The product dispenser mounting system of claim 1 wherein the product dispenser contains any one of a liquid, a foam, or a gel.

10. The product dispenser mounting system of claim 1 wherein the product dispenser contains a hand hygiene product.

11. The product dispenser mounting system of claim 1 wherein the product dispenser contains any one of a hand washing soap or a hand sanitizer.

12. A product dispenser mounting system comprising:
a dispenser holder body configured to support a product dispenser, the dispenser holder body including a top portion having first and second arms configured to receive a neck of the product dispenser, wherein the top portion is pivotally connected to a sidewall of the dispenser holder body such that the first and second arms are moveable between a first, lowered position and a second, raised position;
a mounting apparatus configured to fixedly mount on a support object and to removably connect to the dispenser holder body in multiple orientations such that the dispenser holder body is maintained in a selected one of the multiple orientations when the dispenser holder body is loaded onto an attachment post of the mounting apparatus, wherein the dispenser holder body is configured to rotate relative to the attachment post of the mounting apparatus to orient the dispenser holder body in the selected one of the multiple orientations; and
a sensor module comprising:
at least one actuation sensor configured to detect actuations of the product dispenser; and
one or more processors configured to receive an actuation signal from the at least one actuation sensor and store an electronic record of each of the detected actuations of the product dispenser.

13. The product dispenser mounting system of claim 12, wherein the at least one actuation sensor detects application of a downward force applied to the product dispenser to detect actuations of the product dispenser.

14. The product dispenser mounting system of claim 12, wherein the at least one actuation sensor further includes:
a push button switch including one or more movable contacts and one or more stationary contacts;
a spring biasing the push button switch and the one or more movable contacts to an open position with respect to the one or more stationary contacts when the product dispenser is installed in the dispenser holder,
wherein the spring is compressed upon application of an actuation force to the product dispenser, moving the push button switch in a direction of the actuation force such that the one or more movable contacts are moved into a closed position with respect to the one or more stationary contacts, and
wherein the spring biases the push button switch and the movable contacts to the open position with respect to the one or more stationary contacts when the actuation force is removed.

15. The product dispenser mounting system of claim 12, wherein the one or more processors are further configured to wirelessly communicate dispenser actuation data including the detected actuations of the product dispenser for receipt by at least one computing device.

16. The product dispenser mounting system of claim 15, wherein the at least one computing device includes a local computing device that receives dispenser actuation data from one or more sensor modules associated with one or more dispenser holders installed in a facility.

17. The product dispenser mounting system of claim 16, wherein the at least one computing device analyzes the dispenser actuation data from the one or more sensor modules to monitor hand hygiene compliance in the facility.

18. A system comprising:
a plurality of product dispenser mounting systems, each product dispenser mounting system comprising:
a dispenser holder body configured to support a product dispenser, the dispenser holder body including a top portion having first and second arms configured to receive a neck of the product dispenser, wherein the top portion is pivotally connected to a sidewall of the dispenser holder body such that the first and second arms are moveable between a first, lowered position and a second, raised position;
a mounting apparatus configured to fixedly mount on a support object and to removably connect to the dispenser holder body in multiple orientations such that the dispenser holder body is maintained in a selected one of the multiple orientations when the dispenser holder body is loaded onto an attachment post of the mounting apparatus, wherein the dispenser holder body is configured to rotate relative to the attachment post of the mounting apparatus to orient the dispenser holder body in the selected one of the multiple orientations; and
a sensor module comprising:
at least one actuation sensor configured to detect actuation of the product dispenser; and
one or more processors configured to, in response to receiving actuation signals from the at least one actuation sensor, generate dispenser data associated with the detected actuations of the product dispenser; and
a computing device configured to receive the dispenser data generated by one or more of the sensor modules.

19. The system of claim 18, wherein the computing device is further configured to analyze the dispenser data to monitor hand hygiene compliance for a plurality of users.

* * * * *